United States Patent
Ishigami

(10) Patent No.: US 10,402,998 B2
(45) Date of Patent: Sep. 3, 2019

(54) POSITION ESTIMATION APPARATUS AND POSITION ESTIMATION METHOD

(71) Applicant: Panasonic Intellectual Property Management Co., Ltd., Osaka (JP)

(72) Inventor: Tomohide Ishigami, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 157 days.

(21) Appl. No.: 15/716,923

(22) Filed: Sep. 27, 2017

(65) Prior Publication Data

US 2018/0033160 A1 Feb. 1, 2018

Related U.S. Application Data

(63) Continuation of application No. PCT/JP2016/003850, filed on Aug. 24, 2016.

(30) Foreign Application Priority Data

Mar. 30, 2016 (JP) .................. 2016-069706

(51) Int. Cl.
*G06T 7/73* (2017.01)
*G01C 15/00* (2006.01)
(Continued)

(52) U.S. Cl.
CPC ............... *G06T 7/73* (2017.01); *G01C 15/00* (2013.01); *G01C 21/20* (2013.01); *G06T 7/74* (2017.01);
(Continued)

(58) Field of Classification Search
CPC .... G06T 7/73; G06T 7/74; G06T 7/90; G06T 15/08; G06T 2207/30252;
(Continued)

(56) References Cited

U.S. PATENT DOCUMENTS

| 2009/0167761 A1 | 7/2009 | Hayashi et al. |
| 2015/0228077 A1* | 8/2015 | Menashe ................ G06T 7/593 382/103 |
| 2017/0046868 A1* | 2/2017 | Chernov ............ H04N 13/221 |

FOREIGN PATENT DOCUMENTS

| JP | 2010-134499 | 6/2010 |
| JP | 2011-191239 | 9/2011 |

(Continued)

OTHER PUBLICATIONS

International Search Report dated Nov. 22, 2016 in International Application No. PCT/JP2016/003850.

(Continued)

*Primary Examiner* — Carol Wang
(74) *Attorney, Agent, or Firm* — Wenderoth, Lind & Ponack, L.L.P.

(57) ABSTRACT

A position estimation apparatus which estimates a position of a mobile object in a space includes: a measurement unit which measures, for each of points in a local space in proximity to the mobile object, a position and an attribute; an extractor which extracts position information and attribute information from a result of the measuring by the measurement unit, for each measurement voxel in a group of measurement voxels arrayed three-dimensionally in association with the local space; a map manager which manages position information and attribute information, for each map voxel in a group of map voxels arrayed three-dimensionally in association with the space represented by a map; and a position estimator which estimates a position of the mobile object, based on a position information approximation degree and an attribute information approximation degree.

19 Claims, 16 Drawing Sheets

(51) Int. Cl.
*G01C 21/20* (2006.01)
*G06T 7/90* (2017.01)
*G06T 15/08* (2011.01)

(52) U.S. Cl.
CPC ............... *G06T 7/90* (2017.01); *G06T 15/08* (2013.01); *G06T 2207/10024* (2013.01); *G06T 2207/10028* (2013.01); *G06T 2207/20048* (2013.01); *G06T 2207/20072* (2013.01); *G06T 2207/20076* (2013.01); *G06T 2207/30244* (2013.01); *G06T 2207/30252* (2013.01)

(58) Field of Classification Search
CPC . G06T 2207/30244; G06T 2207/10024; G06T 2207/20076; G06T 2207/10028; G06T 2207/20072; G06T 2207/20048; G01C 15/00; G01C 21/20
See application file for complete search history.

(56) References Cited

FOREIGN PATENT DOCUMENTS

| | | |
|---|---|---|
| JP | 2013-109624 | 6/2013 |
| JP | 2013-187862 | 9/2013 |
| WO | 2007/069726 | 6/2007 |

OTHER PUBLICATIONS

Jeong Yongjin et al., "Global Localization for Mobile Robot using Large-scale 3D Environmental Map and RGB-D Camera", Journal of the Robotics Society of Japan, vol. 31, No. 9, Nov. 2013, pp. 896-906 (with abstract).

Shuji Oishi et al., "ND voxel localization using large-scale 3D environmental map and RGB-D camera", Proceeding of the IEEE, International Conference on Robotics and Biomimetics (ROBIO), Shenzhen, China, Dec. 2013, pp. 538-545.

\* cited by examiner

FIG. 4

MEASUREMENT POINT DATA

| x | y | z | R | G | B |
|---|---|---|---|---|---|
| 100 | 100 | 100 | 255 | 200 | 150 |
| 90 | 100 | 100 | 250 | 190 | 150 |
| .. | .. | .. | .. | .. | .. |

FIG. 5

VOXEL DATA

| INDEX | | | POSITION INFORMATION | | | COLOR INFORMATION | | |
|---|---|---|---|---|---|---|---|---|
| x (INDEX) | y (INDEX) | z (INDEX) | x (AVERAGE) | y (AVERAGE) | z (AVERAGE) | R (AVERAGE) | G (AVERAGE) | B (AVERAGE) |
| 1 | 1 | 1 | 100 | 100 | 100 | 255 | 200 | 150 |
| 2 | 1 | 1 | 200 | 100 | 100 | 250 | 190 | 150 |
| .. | .. | .. | .. | .. | .. | .. | .. | .. |

PARTICLE DATA

| x | y | z | $\theta_{yaw}$ | LIKELIHOOD |
|---|---|---|---|---|
| 10 | 20 | 30 | 0.52 | 100 |

FIG. 14

MAP VOXEL DATA

| x (INDEX) | y (INDEX) | z (INDEX) | x (AVERAGE) | y (AVERAGE) | z (AVERAGE) | x (FIRST EIGEN VECTOR) | y (FIRST EIGEN VECTOR) | z (FIRST EIGEN VECTOR) | x (SECOND EIGEN VECTOR) | y (SECOND EIGEN VECTOR) | z (SECOND EIGEN VECTOR) | R (AVERAGE) | G (AVERAGE) | B (AVERAGE) |
|---|---|---|---|---|---|---|---|---|---|---|---|---|---|---|
| 1 | 1 | 1 | 100 | 100 | 100 | 90 | 0 | 90 | 0 | 90 | 90 | 255 | 200 | 150 |
| 2 | 1 | 1 | 200 | 100 | 100 | 90 | 0 | 90 | 0 | 90 | 90 | 250 | 190 | 150 |
| .. | .. | .. | .. | .. | .. | .. | .. | .. | .. | .. | .. | .. | .. | .. |

FIG. 15

VOXEL DATA

| x (INDEX) | y (INDEX) | z (INDEX) | x (AVERAGE) | y (AVERAGE) | z (AVERAGE) | R 000~063 | R 064~127 | R 128~191 | R 192~255 | G 000~063 | G 064~127 | G 128~191 | G 192~255 | B 000~063 | B 064~127 | B 128~191 | B 192~255 |
|---|---|---|---|---|---|---|---|---|---|---|---|---|---|---|---|---|---|
| 1 | 1 | 1 | 100 | 100 | 100 | 0.3 | 0.2 | 0.3 | 0.2 | 0.2 | 0.3 | 0.3 | 0.2 | 0.2 | 0.2 | 0.3 | 0.3 |
| 2 | 1 | 1 | 200 | 100 | 100 | 0.3 | 0.2 | 0.3 | 0.2 | 0.2 | 0.3 | 0.3 | 0.2 | 0.2 | 0.2 | 0.3 | 0.3 |
| .. | .. | .. | .. | .. | .. | .. | .. | .. | .. | .. | .. | .. | .. | .. | .. | .. | .. |

FIG. 19

MEASUREMENT POINT DATA

| x | y | z | REFLECTION INTENSITY |
|---|---|---|---|
| 100 | 100 | 100 | 0.95 |
| 90 | 100 | 100 | 0.50 |
| .. | .. | .. | .. |

FIG. 20

VOXEL DATA

| x (INDEX) | y (INDEX) | z (INDEX) | x (AVERAGE) | y (AVERAGE) | z (AVERAGE) | AVERAGE REFLECTION INTENSITY |
|---|---|---|---|---|---|---|
| 1 | 1 | 1 | 100 | 100 | 100 | 0.95 |
| 2 | 1 | 1 | 200 | 100 | 100 | 0.50 |
| .. | .. | .. | .. | .. | .. | .. |

FIG. 23

MEASUREMENT POINT DATA

| x | y | z | TEMPERATURE |
|---|---|---|---|
| 100 | 100 | 100 | 300 |
| 90 | 100 | 100 | 305 |
| .. | .. | .. | .. |

FIG. 24

VOXEL DATA

| x (INDEX) | y (INDEX) | z (INDEX) | x (AVERAGE) | y (AVERAGE) | z (AVERAGE) | AVERAGE TEMPERATURE |
|---|---|---|---|---|---|---|
| 1 | 1 | 1 | 100 | 100 | 100 | 300 |
| 2 | 1 | 1 | 200 | 100 | 100 | 290 |
| .. | .. | .. | .. | .. | .. | .. |

POSITION ESTIMATION APPARATUS AND POSITION ESTIMATION METHOD

CROSS REFERENCE TO RELATED APPLICATIONS

This application is a U.S. continuation application of PCT International Patent Application Number PCT/JP2016/003850 filed on Aug. 24, 2016, claiming the benefit of priority of Japanese Patent Application Number 2016-069706 filed on Mar. 30, 2016, the entire contents of which are hereby incorporated by reference.

BACKGROUND

1. Technical Field

The present disclosure relates to a position estimation apparatus which estimates a position of a mobile object in a space.

2. Description of the Related Art

Japanese Unexamined Patent Application Publication No. 2013-109624 discloses a technique of displaying an image of map data which is translated and rotated and is superimposed on a camera image, and estimating a position according to a degree of similarity. "Global Localization for Mobile Robot using Large-scale 3D Environmental Map and RGB-D Camera", Yongjin Jeong, and three others, The Robotics Society of Japan, 2013, Vol. 31, No. 9, pp. 896-906, discloses a technique of representing, in relation to a three-dimensional coordinate, map data and measurement data that is measured by a camera, as a group of voxels (small cuboid regions resulting from partitioning a three-dimensional space), and collating the voxels to estimate a position of the camera.

SUMMARY

When a position of a mobile object such as a camera is estimated using map data indicating a position in a space (three-dimensional space) in a three-dimensional coordinate and measurement data such as a camera image, it is useful in reducing a load of calculation related to collating of voxels (i.e., speeding up of position estimation) to use a position (tree-dimensional coordinates) of a voxel as in the technique disclosed by "Global Localization for Mobile Robot using Large-scale 3D Environmental Map and RGB-D Camera", Yongjin Jeong, and three others, The Robotics Society of Japan, 2013, Vol. 31, No. 9, pp. 896-906. However, in such an environment in which structures having similar shapes are consecutively disposed, there are instances where the position estimation is not properly performed.

The present disclosure provides a position estimation apparatus which estimates a position of a mobile object in a space, with an enhanced possibility of properly performing position estimation even in such an environment in which structures having similar shapes are consecutively disposed. In addition, the present disclosure provides a position estimation method performed by the position estimation apparatus and a control program for estimating a position.

A position estimation apparatus according to the present disclosure is a position estimation apparatus which estimates a position of a mobile object in a space. The position estimation apparatus includes: a measurement unit configured to measure, for each of a plurality of points in a local space in proximity to the mobile object, a position and an attribute that is detected by receiving electromagnetic waves from the point; an extractor which extracts position information and attribute information from a result of the measuring by the measurement unit, for each measurement voxel in a group of measurement voxels arrayed three-dimensionally in association with the local space; a map manager which manages position information and attribute information, for each map voxel in a group of map voxels arrayed three-dimensionally in association with the space represented by a map; and a position estimator which estimates a position of the mobile object, based on (i) a position information approximation degree that is a degree of approximation between the position information of the map voxel managed by the map manager and the position information of the measurement voxel extracted by the extractor and (ii) an attribute information approximation degree that is a degree of approximation between the attribute information of the map voxel managed by the map manager and the attribute information of the measurement voxel extracted by the extractor.

In addition, a position estimation method according to the present disclosure is a position estimation method performed by a position estimation apparatus which estimates a position of a mobile object in a space. The position estimation method includes: measuring, for each of a plurality of points in a local space in proximity to the mobile object, a position and an attribute that is detected by receiving electromagnetic waves from the point; extracting position information and attribute information from a result of the measuring in the measuring, for each measurement voxel in a group of measurement voxels arrayed three-dimensionally in association with the local space; managing position information and attribute information, for each map voxel in a group of map voxels arrayed three-dimensionally in association with the space represented by a map; and estimating a position of the mobile object, based on (i) a position information approximation degree that is a degree of approximation between the position information of the map voxel managed in the managing and the position information of the measurement voxel extracted in the extracting and (ii) an attribute information approximation degree that is a degree of approximation between the attribute information of the map voxel managed in the managing and the attribute information of the measurement voxel extracted in the extracting.

In addition, a control program according to the present disclosure is a control program for causing a position estimation apparatus which includes a microprocessor and estimates a position of a mobile object in a space, to execute position estimation processing. The position estimation processing includes: obtaining a result of measuring, for each of a plurality of points in a local space in proximity to the mobile object, a position and an attribute that is detected by receiving electromagnetic waves from the point; extracting position information and attribute information from a result of the measuring obtained in the obtaining, for each measurement voxel in a group of measurement voxels arrayed three-dimensionally in association with the local space; managing position information and attribute information, for each map voxel in a group of map voxels arrayed three-dimensionally in association with the space represented by a map; and estimating a position of the mobile object, based on (i) a position information approximation degree that is a degree of approximation between the position information of the map voxel managed in the managing and the position information of the measurement voxel extracted in the extracting and (ii) an attribute information approximation degree that is a degree of approximation between the attribute information of the map voxel managed in the managing and the attribute information of the measurement voxel extracted in the extracting.

With the position estimation apparatus and the like according to the present disclosure, it is possible to enhance the possibility of promptly and properly estimating a position of a mobile object even in such an environment in which structures having similar shapes are consecutively disposed.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 4 is a diagram which illustrates an example of the measurement point data according to Embodiment 1;

FIG. 5 is a diagram which illustrates an example of the voxel data according to Embodiment 1;

FIG. 14 is a diagram which illustrates an example of map voxel data according to Modification 1 of Embodiment 1;

FIG. 15 is a diagram which illustrates an example of voxel data according to Modification 2 of Embodiment 1;

FIG. 19 is a diagram which illustrates an example of measurement point data according to Embodiment 2;

FIG. 20 is a diagram which illustrates an example of voxel data according to Embodiment 2;

FIG. 23 is a diagram which illustrates an example of measurement point data according to Embodiment 3;

FIG. 24 is a diagram which illustrates an example of voxel data according to Embodiment 3.

DETAILED DESCRIPTION OF THE EMBODIMENTS

Figure 1:
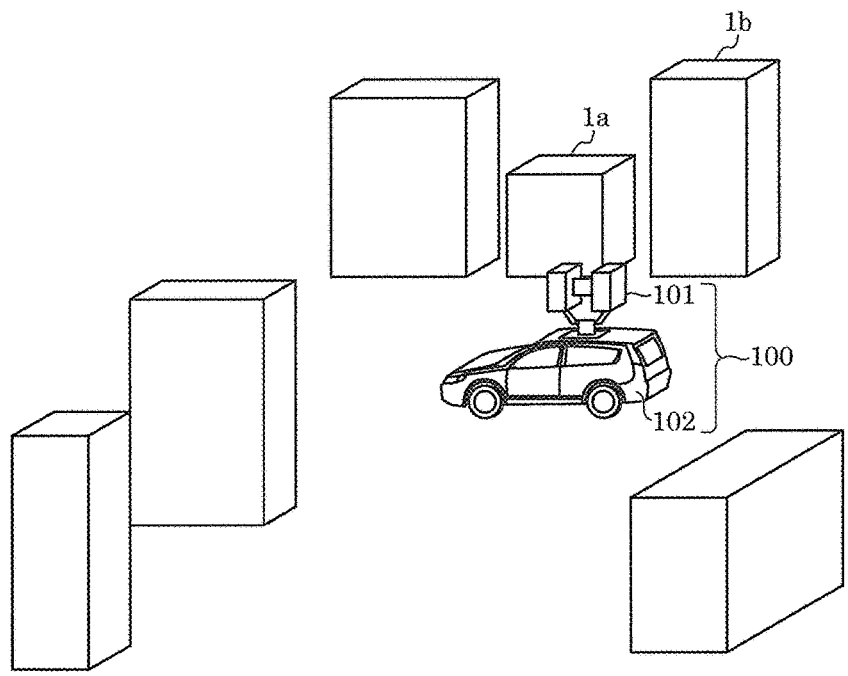
FIG. 1 is a schematic diagram which illustrates an example of a space in which the position estimation apparatus according to Embodiment 1 is present.

In order to enhance the possibility of promptly and properly estimating a position of a mobile object even in such an environment in which structures having similar shapes are consecutively disposed, a position estimation apparatus according to the present disclosure is a position estimation apparatus which estimates a position of a mobile object in a space, and includes: a measurement unit configured to measure, for each of a plurality of points in a local space in proximity to the mobile object, a position and an attribute that is detected by receiving electromagnetic waves from the point; an extractor which extracts position information and attribute information from a result of the measuring by the measurement unit, for each measurement voxel in a group of measurement voxels arrayed three-dimensionally in association with the local space; a map manager which manages position information and attribute information, for each map voxel in a group of map voxels arrayed three-dimensionally in association with the space represented by a map; and a position estimator which estimates a position of the mobile object, based on (i) a position information approximation degree that is a degree of approximation between the position information of the map voxel managed by the map manager and the position information of the measurement voxel extracted by the extractor and (ii) an attribute information approximation degree that is a degree of approximation between the attribute information of the map voxel managed by the map manager and the attribute information of the measurement voxel extracted by the extractor.

According to the above-described configuration, a position is estimated using not only a position of a voxel but also attribute information (information based on an attribute detected by receiving electromagnetic waves, such as a color, a temperature, a reflection intensity, etc.). Even in such an environment in which structures having similar shapes are consecutively disposed, attributes may be different among the structures. It is thus possible to enhance the possibility of promptly and properly estimating a position of a mobile object.

Here, for example, the position estimator may: calculate a degree of approximation between the position information of the map voxel and the position information of the measurement voxel which is transformed using each of a plurality of transformation operations for transforming a three-dimensional coordinate system of the local space into a three-dimensional coordinate system of the space; calculate, for each of the plurality of transformation operations, a likelihood based on the position information approximation degree having a highest degree of approximation among the calculated degrees of approximation and the attribute information approximation degree having a highest degree of approximation among the calculated degrees of approximation; and perform the estimating of the position of the mobile object according to, among the plurality of transformation operations, a transformation operation corresponding to a highest likelihood among the calculated likelihoods, or a transformation operation resulting from performing weighted averaging according to the calculated likelihoods.

In this manner, a likelihood related to the possibility of a position in a space to which a position of a measured local space corresponds is calculated based on not only the position information approximation degree but also the attribute information approximation degree, and thus it is possible to properly estimate a position of a mobile object.

In addition, for example, the position estimator may repeat the calculating of the likelihood and the estimating of the position of the mobile object, based on the calculating of the degree of approximation of the measurement voxel corresponding to the position information transformed using each of the plurality of transformation operations, and determine the plurality of transformation operations used in the transforming to be performed next, based on a result of the calculating of the likelihood.

In this manner, performing of the estimating is repeated, and thus there is a possibility that the accuracy in estimating a position can be increased.

In addition, for example, the position estimator: the position estimator may: calculate a degree of approximation between the position information of the map voxel and the position information of the measurement voxel, the position information of the measurement voxel being transformed using each of a plurality of transformation operations for transforming a three-dimensional coordinate system of the local space into a three-dimensional coordinate system of the space; calculate, for each of the plurality of transformation operations, a likelihood based on the position information approximation degree having a highest degree of approximation among the calculated degrees of approximation; and perform the estimating of the mobile object according to, among the plurality of transformation operations, a transformation operation corresponding to a highest likelihood among the calculated likelihoods, or a transformation operation resulting from performing weighted averaging according to the calculated likelihoods; and may repeat the calculating of the likelihood and the estimating of the position of the mobile object, based on the calculating of the degree of approximation of the measurement voxel corresponding to the position information transformed using each of the plurality of transformation operations, determine the plurality of transformation operations used in the transforming to be performed next, based on a result of the calculating of the likelihood, and perform the calculating of the likelihood based on the attribute information approximation degree in addition to the position information approximation degree, under a predetermined condition other than a first time of performing the repeating.

In this manner, it is possible to efficiently perform the position estimation.

In addition, for example, the extractor may perform the extracting by determining, for each of the measurement voxels, position information of the measurement voxel such that the position information indicates an average of positions of the plurality of points in the measurement voxel, the positions being measured by the measurement unit, and the position information of the map voxel managed by the map manager may indicate an average of positions of a plurality of points in a portion of the space corresponding to the map voxel.

In this manner, a position is estimated by comparing position information among voxels (calculation of a degree of approximation, etc.) using position information in which the measured positions are compressed for each of the voxels, and thus a calculation load is decreased compared to the case where all of the measured positions are used in comparison. This makes it possible to perform prompt position estimation.

In addition, for example, the position information of each of the measurement voxels extracted by the extractor or the position information of each of the map voxels managed by the map manager may further indicate a plane identified by a variance-covariance matrix determined based on a position of each point in the measurement voxel or the map voxel, and the position estimator may perform the calculating of the likelihood by identifying the position information approximation degree, according to a distance between (i) an average of positions indicated by one of the position information of the map voxel and the position information of the measurement voxel and (ii) a plane indicated by an other of the position information of the map voxel and the position information of the measurement voxel.

In this manner, there is a possibility that the position estimation can be performed with higher accuracy, by using the position information indicating a plane.

In addition, for example, the extractor may perform the extracting by determining, for each of the measurement voxels, attribute information of the measurement voxel such that the attribute information indicates a histogram based on an attribute of each point in the measurement voxel, the attribute being measured by the measurement unit, the attribute information of the map voxel managed by the map manager may indicate a histogram of a plurality of points in a portion of the space corresponding to the map voxel, the histogram being based on attributes detected by receiving electromagnetic waves from the plurality of points, and the position estimator may perform the calculating of the likelihood by identifying the attribute information approximation degree, according to a distance between the histogram indicated by one of the attribute information of the map voxel and the attribute information of the measurement voxel and the histogram indicated by an other of the attribute information of the map voxel and the attribute information of the measurement voxel.

In this manner, there is a possibility that the position estimation can be performed with higher accuracy, compared to the case where, for example, attribute information simply indicates a one-dimensional value.

In addition, for example, the extractor may perform the extracting by determining, for each of the measurement voxels, attribute information of the measurement voxel such that the attribute information indicates an average of attributes of the plurality of points in the measurement voxel, the attributes being measured by the measurement unit, and the attribute information of the map voxel managed by the map manager may indicate an average of attributes of a plurality of points in a portion of the space corresponding to the map voxel, the attributes being detected by receiving electromagnetic waves from the plurality of points.

In this manner, a position is estimated by comparing attribute information among voxels (calculation of a degree of approximation, etc.) using attribute information in which the measured attributes are compressed for each of the voxels, and thus a calculation load is decreased compared to the case where all of the measured positions are used in comparison. This makes it possible to perform prompt position estimation.

In addition, for example, the extractor may perform the extracting by determining, for each of the measurement voxels, attribute information of the measurement voxel such that the attribute information indicates a correlation between a position and an attribute of each point in the measurement voxel which are measured by the measurement unit, and the attribute information of the map voxel managed by the map manager may indicate a correlation of each of a plurality of points in a portion of the space corresponding to the map voxel, the correlation being a correlation between a position and an attribute that is detected by receiving electromagnetic waves.

In this manner, attribute information which indicates local autocorrelation based on a measurement point in a voxel is used, and thus there is a possibility that a position estimation can be performed with higher accuracy, compared to the case where, for example, attribute information which indicates only an average of attributes of measurement points is used.

In addition, for example, the extractor may perform the extracting by determining, for each of the measurement voxels, attribute information of the measurement voxel such that the attribute information indicates a correlation of each point in the measurement voxel and one or more measurement voxels adjacent to the measurement voxel, the correlation being a correlation between a position and an attribute which are measured by the measurement unit, and the attribute information of the map voxel managed by the map manager may indicate a correlation of each of a plurality of points in a portion of the space corresponding to the map voxel and a portion of the space corresponding to one or more map voxels adjacent to the map voxel, the correlation being a correlation between a position and an attribute that is detected by receiving electromagnetic waves.

In this manner, attribute information which indicates local autocorrelation based on measurement points in a group of adjacent voxels is used, and thus there is a possibility that a position estimation can be performed with higher accuracy, compared to the case where, for example, attribute information which indicates only an average of attributes of measurement points is used.

In addition, for example, the attribute measured by the measurement unit may be a color, the attribute information extracted by the extractor may be color information indicating a color, and the attribute information managed by the map manager may be color information indicating a color.

In this manner, estimation is performed using not only a position of a voxel but also color information. Even in such an environment in which structures having similar shapes are consecutively disposed, colors may be different among the structures. It is thus possible to enhance the possibility of promptly and properly estimating a position of a mobile object.

In addition, for example, each of the color information extracted by the extractor and the color information managed by the map manager may be information distinguishable between a specified color component and a color component other than the specified color component, and the position estimator may calculate the attribute information approximation degree which is used as a basis for the calculating of the likelihood such that a degree of influence on the degree of approximation of the specified color component is varied from a degree of influence on the degree of approximation of the color component other than the specified color component, in the attribute information of the measurement voxel and the attribute information of the map voxel.

In this manner, by determining a specified color component for a tree, the sky, etc., whose aspects (external appearances and the like) change due to years, seasons, times, etc., and whose colors are unique, there is a possibility that decrease in accuracy of position estimation, due to the influence of items (a tree, the sky, etc.) whose aspects change in a space, is suppressed.

In addition, for example, each of the color information extracted by the extractor and the color information managed by the map manager may be information distinguishable between a specified color component and a color component other than the specified color component, and the position estimator may calculate the attribute information approximation degree which is used as a basis for the calculating of the likelihood such that, when the position information of the measurement voxel satisfies a predetermined position condition, a degree of influence on the degree of approximation of the specified color component is varied from a degree of influence on the degree of approximation of the color component other than the specified color component, in the attribute information of the measurement voxel.

In this manner, since a position at which an item whose aspect changes in a space is present is limited, by properly determining a predetermined position condition, there is a possibility that decrease in accuracy of position estimation, due to the influence of the item whose aspect changes in a space, is suppressed.

In addition, for example, the map manager may manage a degree of flatness, for each map voxel in the group of map voxels arrayed three-dimensionally in association with the space represented by the map, and the position estimator may calculate the attribute information approximation degree which is used as a basis for the calculating of the likelihood such that, when the degree of flatness of the map voxel satisfies a predetermined condition, a degree of influence on the degree of approximation of the specified color component is varied from a degree of influence on the degree of approximation of the color component other than the specified color component, in the attribute information of the map voxel.

In this manner, since an item whose aspect changes in a space is limited by the degree of flatness, by properly determining a predetermined position condition, there is a possibility that decrease in accuracy of position estimation due to the influence of the item whose aspect changes in a space is suppressed.

In addition, for example, the attribute measured by the measurement unit may be a reflection intensity of an electromagnetic wave, the attribute information extracted by the extractor may indicate a reflection intensity, and the attribute information managed by the map manager may indicate a reflection intensity.

In this manner, estimation is performed using not only a position of a voxel but also attribute information indicating a reflection intensity. Even in such an environment in which structures having similar shapes are consecutively disposed, reflection intensities of electromagnetic waves may be different among the structures. It is thus possible to enhance the possibility of promptly and properly estimating a position of a mobile object.

In addition, for example, the position estimator may calculate the attribute information approximation degree which is used as a basis for the calculating of the likelihood such that, when the position information of the measurement voxel satisfies a predetermined position condition, a degree of influence on the degree of approximation when the attribute information of the measurement voxel indicates a reflection intensity higher than a predetermined intensity is higher than a degree of influence on the degree of approximation when the attribute information of the measurement voxel indicates a reflection intensity equal to or lower than the predetermined intensity, in the attribute information of the measurement voxel.

In this manner, for example, by determining that a predetermined position condition is satisfied when a position is at a height close to a road surface, there is a possibility that position estimation can be performed accurately, based on a road display such as a while line having a high reflection intensity, for example.

In addition, for example, the attribute measured by the measurement unit may be a temperature, the attribute information extracted by the extractor may indicate a temperature, and the attribute information managed by the map manager may indicate a temperature.

In this manner, estimation is performed using not only a position of a voxel but also attribute information indicating a temperature. Even in such an environment in which structures having similar shapes are consecutively disposed, temperatures may be different among the structures. It is thus possible to enhance the possibility of promptly and properly estimating a position of a mobile object.

In addition, for example, the position estimator may calculate the attribute information approximation degree which is used as a basis for the calculating of the likelihood such that, when the position information of the measurement voxel satisfies a predetermined position condition, a degree of influence on the degree of approximation when the attribute information of the measurement voxel indicates a temperature out of a predetermined temperature range that corresponds to a body temperature of a human is higher than a degree of influence on the degree of approximation when the attribute information of the measurement voxel indicates a temperature in the predetermined temperature range, in the attribute information of the measurement voxel.

In this manner, there is a possibility that decrease in accuracy of position estimation due to the influence of a person who moves over time can be suppressed.

In addition, for example, the position estimator may output estimated information indicating a position of the mobile object.

With this, use of a result of position estimation can be facilitated.

In addition, a position estimation method according to the present disclosure is a position estimation method performed by a position estimation apparatus which estimates a position of a mobile object in a space. The position estimation method includes: measuring, for each of a plurality of points in a local space in proximity to the mobile object, a position and an attribute that is detected by receiving electromagnetic waves from the point; extracting position information and attribute information from a result of the measuring in the measuring, for each measurement voxel in a group of measurement voxels arrayed three-dimensionally in association with the local space; managing position information and attribute information, for each map voxel in a group of map voxels arrayed three-dimensionally in association with the space represented by a map; and estimating a position of the mobile object, based on (i) a position information approximation degree that is a degree of approximation between the position information of the map voxel managed in the managing and the position information of the measurement voxel extracted in the extracting and (ii) an attribute information approximation degree that is a degree of approximation between the attribute information of the map voxel managed in the managing and the attribute information of the measurement voxel extracted in the extracting.

In this manner, even in such an environment in which structures having similar shapes are consecutively disposed, attributes may be different among the structures. It is thus possible to enhance the possibility of promptly and properly estimating a position of a mobile object.

In addition, a control program according to the present disclosure is a control program for causing a position estimation apparatus which includes a microprocessor and estimates a position of a mobile object in a space, to execute position estimation processing. The position estimation processing includes: obtaining a result of measuring, for each of a plurality of points in a local space in proximity to the mobile object, a position and an attribute that is detected by receiving electromagnetic waves from the point; extracting position information and attribute information from a result of the measuring obtained in the obtaining, for each measurement voxel in a group of measurement voxels arrayed three-dimensionally in association with the local space; managing position information and attribute information, for each map voxel in a group of map voxels arrayed three-dimensionally in association with the space represented by a map; and estimating a position of the mobile object, based on (i) a position information approximation degree that is a degree of approximation between the position information of the map voxel managed in the managing and the position information of the measurement voxel extracted in the extracting and (ii) an attribute information approximation degree that is a degree of approximation between the attribute information of the map voxel managed in the managing and the attribute information of the measurement voxel extracted in the extracting.

In this manner, a position estimation apparatus which includes a microprocessor on which the control program is installed and executed is capable of promptly and properly estimating a position of a mobile object, by obtaining and using a measurement result including an attribute of a measurement point.

It should be noted that the above-described general or specific embodiments include an apparatus, a system, a method, an integrated circuit, a computer program, a computer-readable recording medium, etc., or an arbitrary combination of the apparatus, the system, the method, the integrated circuit, the computer program, the computer-readable recording medium, etc.

Hereinafter, embodiments shall be discussed in detail with reference to the drawings as necessary. However, description that is too detailed will be omitted in some cases. For example, there are instances where detailed description of well-known matter and redundant description of substantially identical components are omitted. This is for the purpose of preventing the following description from being unnecessarily redundant and facilitating understanding of those skilled in the art.

It should be noted that the inventors provide the accompanying Drawings and subsequent description to allow a person of ordinary skill in the art to sufficiently understand the present disclosure, and are thus not intended to limit the scope of the subject matter recited in the Claims. Thus, the numerical values, shapes, structural components, the disposition and connection of the structural components, steps (processes), the processing order of the steps, etc. described in the following description using specific examples are mere examples, and do not intend to limit the scope of the subject matter recited in the Claims. Therefore, among the structural components in the following embodiments, structural components not recited in any one of the independent claims are described as structural components which can be arbitrarily added. In addition, each diagram is a schematic diagram and not necessarily strictly illustrated.

Embodiment 1

In Embodiment 1, position estimation apparatus 100 which performs a position estimation method using a color in addition to a position, for estimating a position of a mobile object in a space is mainly described.

The following describes Embodiment 1 with reference to the drawings.

(1-1. Configuration)

FIG. 1 illustrates an example of position estimation apparatus 100 according to Embodiment 1, and an example of a space in which position estimation apparatus 100 is present.

Position estimation apparatus 100 is, as illustrated in FIG. 1, mobile object 102 to which measurement device 101 is attached, for example, and moves in a space (three-dimensional (3D) space) in which a structure such as building 1a and building 1b, and other objects are present. Position estimation apparatus 100 has a function of estimating a position of mobile object 102 in the space.

Measurement device 101 measures a position and a color of each of a plurality of points (measurement points) in a local space in proximity to measurement device 101. Here, the measurement points may each be a place having a certain size according to a measurement capability (resolution capability), and the like. A color of a measurement point is one of attributes of the measurement point, which is detected by receiving electromagnetic waves from the point, and is detected, for example, by receiving visible light (a form of the electromagnetic wave) of a wavelength in a range from 380 nm to 780 nm. Measurement device 101 is, for example, a three-dimensional scanner (3D scanner), a stereo camera, or a combination of a camera and a 3D light detection and ranging (3D-LiDAR) or a two-dimensional laser range finder.

Mobile object 102 is, for example, a robot, an aircraft, a vessel, a vehicle, etc., and is capable of moving in a space. In the case where mobile object 102 is a robot, mobile object 102 may be, for example, a vehicle having a wheel, a robot walking with two legs, etc., as long as mobile object 102 can move. Here, mobile object 102 is explained assuming that mobile object 102 is a vehicle-type robot capable of driving on a road surface (ground surface), or a vehicle.

Position estimation apparatus 100 includes a computer capable of communicating with measurement device 101, and the computer is mounted, for example, on mobile object 102.

The computer of position estimation apparatus 100 includes a memory, a processor (microprocessor), a communication interface (I/F), etc. The computer may include, for example, a storage medium such as a hard disk, in addition to the memory. The memory is a ROM storing a program and data in advance, a RAM for use in storing data and the like when executing a program, etc., and may include, for example, a non-volatile memory. In the memory, a control program for achieving position estimation processing according to the position estimation method, a settings value to be used in the control program, etc., are stored in advance. In addition, in the storage medium such as a memory, map information (map voxel data, etc., that will be described later) which represents the space in which mobile object 102 moves as a three-dimensional coordinate system is stored. The processor executes a control program to control the communication I/F, etc., thereby performing various processes. The memory is also used for temporarily storing values that are used when executing control programs by the processor. The communication I/F is, for example, a communication circuit, etc. for communicating with measurement device 101, etc., through radio communication or communication via a cable. The communication I/F may have a function of communicating with an external device distant from mobile object 102, via a communication network. Through the communication with an external device, for example, it is possible to obtain (download) map information corresponding to a space which is a possible move range of mobile object 102 for a predetermined period, or to transmit an estimated position of mobile object 102 to the external device.

The following describes in detail that a function of the above-described position estimation apparatus 100.

Figure 2:
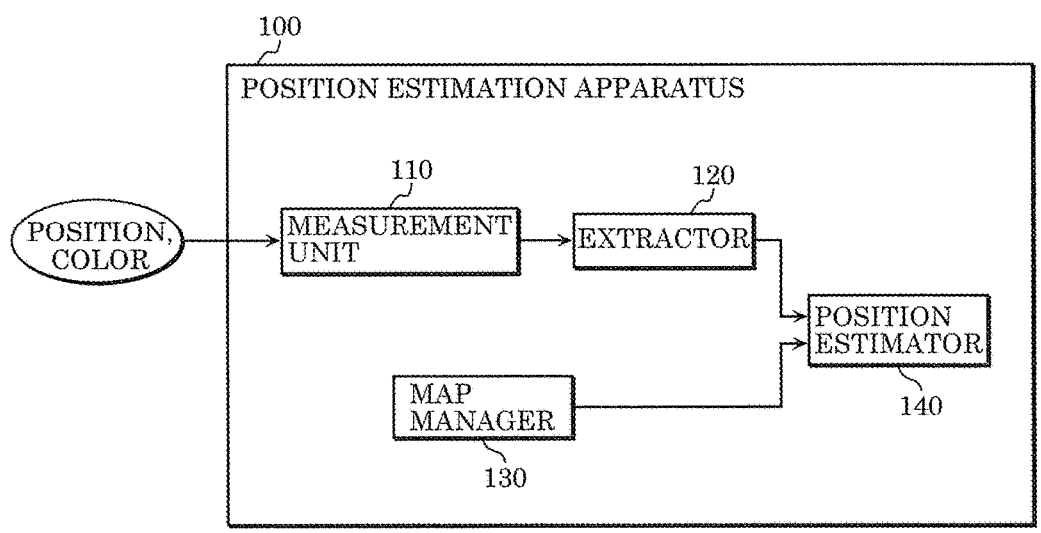
FIG. 2 is a functional block diagram of the position estimation apparatus according to Embodiment 1.

FIG. 2 is a functional block diagram of position estimation apparatus 100. As illustrated in FIG. 2, position estimation apparatus 100 includes measurement unit 110, extractor 120, map manager 130, and position estimator 140. The following describes each of the functional components.

(1-1-1. Measurement Unit)

Measurement unit 110 has a function of measuring a position and a color of each of a plurality of points (i.e., measurement points) in a local space in proximity to mobile object 102, and performs measurement to obtain measurement point data that is a result of the measurement. Measurement unit 110 is implemented by, for example, measurement device 101, and the communication I/F, a processor which executes a control program, etc., in the computer of position estimation apparatus 100.

The position of mobile object 102 can change successively. Accordingly, for example, measurement unit 110 may repeatedly obtain, by measurement device 101, a group of measurement point data of each of the measurement points in a local space in proximity to mobile object 102 (for example, each of the measurement points in the entire circumference in a horizontal direction, etc.), for each predetermined period.

(1-1-2. Extractor)

Extractor 120 has a function of extracting, on the basis of the result of the measurement (measurement point data) performed by measurement unit 110, position information and attribute information (specifically, color information indicating a color) of each voxel included in a group of voxels three-dimensionally arrayed in association with the local space in proximity to mobile object 102. Extractor 120 is implemented by a processor or the like which executes a control program, in the computer of position estimation apparatus 100.

The measurement point data resulting from measuring the local space includes a position represented by coordinates n the three-dimensional coordinate system determined by measurement unit 110 (measurement device 101, or the like). Extractor 120 extracts data (voxel data) on each voxel in the group of voxels resulting from partitioning the local space into a group of cuboid voxels according to the three-dimensional coordinate system, from the measurement point data according to a group of measurement points.

Voxel data includes position information in the three-dimensional coordinate system, and color information. The voxel data extracted from the measurement point data by extractor 120 is referred to as measurement voxel data, and a voxel which has the measurement voxel data is referred to as a measurement voxel. In extracting (extraction process) of measurement voxel data (position information and color information) on a measurement voxel performed by extractor 120, measurement voxel data on a measurement voxel is calculated from the group of measurement point data on a plurality of measurement points included in the measurement voxel, in such a manner that data is compressed in terms of an information amount. The compression of the amount of information addresses a problem of difficulty in real-time position estimation due to an increase in a calculation amount that occurs when measurement points are compared as they are, because the amount of information increases to a greater degree in the three-dimensional space than in the two-dimensional plane.

The extraction of measurement voxel data by extractor 120 is carried out, for example, by determining, for each measurement voxel, position information of the measurement voxel such that the position information indicates an average of positions of the respective points in the measurement voxel which are measured by measurement unit 110. As an example, extractor 120 averages positions (positions represented by the three-dimensional coordinates, x, y, and z) of the measurement point data on the measurement points included in the measurement voxel, to calculate position information of the measurement voxel data on the measurement voxel. In addition, the extraction of measurement voxel data by extractor 120 is carried out, for example, by determining, for each measurement voxel, color information of the measurement voxel such that the color information indicates an average of colors of the respective points in the measurement voxel measured by measurement unit 110. As an example, extractor 120 averages colors represented by components of red (R), green (G), and blue (B) (RGB value in which each component of R, G, and B is represented by 8 bits) of the measurement point data on the measurement points included in the measurement voxel, to calculate color information of the measurement voxel data on the measurement voxel.

Figure 3:
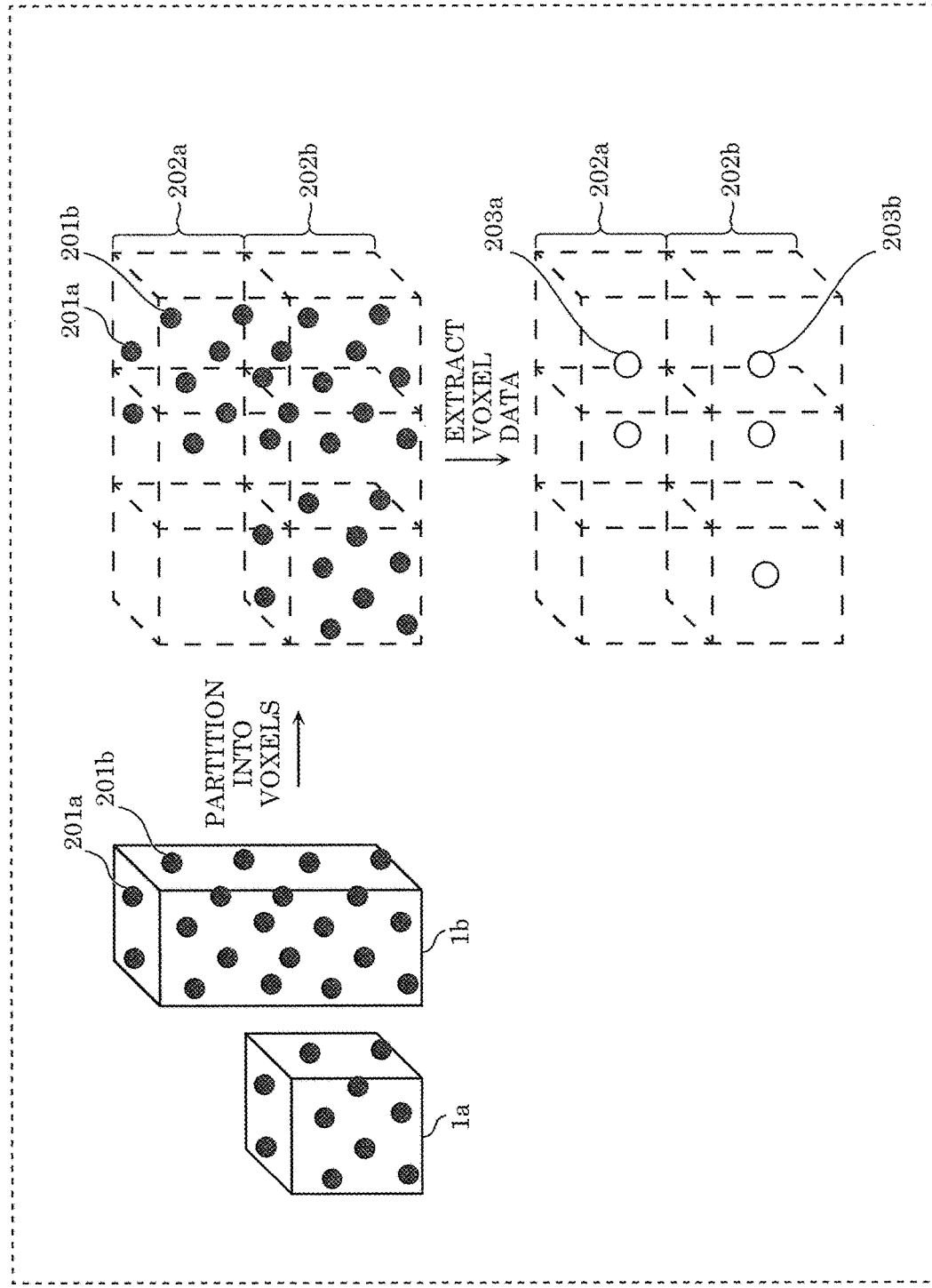
FIG. 3 is a conceptual diagram which illustrates processes of extracting data on a voxel (voxel data), based on data of a measurement point (measurement point data) in a space.

FIG. 3 is a conceptual diagram which illustrates processes of extracting measurement voxel data on a measurement voxel, based on measurement point data on a measurement point in a space. In the diagram, each measurement point data (measurement point data 201a, etc.) is placed at a position associated with a position of the measurement point, and measurement voxel data (measurement voxel data 203a, etc.) held by a measurement voxel is placed at a position associated with a position indicated by position information of the measurement voxel data. Measurement unit 110 performs measurement in a local space in proximity to mobile object 102 which is a part of the space, and measurement point data 201a, 201b, etc., of a plurality of measurement points including building 1a and building 1b are obtained. Extractor 120 partitions the local space that is a measured area into a group of voxels (for example, a cube with a side having a length of several meters, etc.) such as measurement voxels 202a, 202b, etc., (in other words, associates the local space with the three dimensional array of the group of voxels). Measurement voxel 202a has measurement voxel data 203a, and measurement voxel 202b has measurement voxel data 203b. Measurement point data 201a, 201b, etc., corresponding to the measurement points included in measurement voxel 202a are reflected in measurement voxel data 203a of measurement voxel 202a.

As exemplified in FIG. 4, measurement point data indicates a position as three-dimensional coordinates x, y, and z, and indicates a color as RGB values. It should be noted that the measurement point data on one measurement point is indicated in one row in FIG. 4. FIG. 5 is a diagram which illustrates an example of measurement voxel data, and the measurement voxel data on one measurement voxel is indicated in one row. The measurement voxel data illustrated in FIG. 5 is temporarily held by a storage medium such as a memory. As illustrated in FIG. 5, measurement voxel data includes an index which indicates a location of a corresponding measurement voxel in the three-dimensional array of a group of measurement voxels associated with the local space, position information which indicates an average of positions of the respective measurement point data in the measurement voxel, and color information which indicates an average of colors (RGB values) of the respective measurement point data in the measurement voxel. For example, the position information of measurement voxel data 203a illustrated in FIG. 3 indicates an average of positions of measurement point data (measurement point data 201a, measurement point data 201b, etc.) corresponding to the measurement points included in measurement voxel 202a, and the color information of measurement voxel data 203a indicates an average of colors of measurement point data (measurement point data 201a, measurement point data 201b, etc.) corresponding to the measurement points included in measurement voxel 202a.

(1-1-3. Map Manager)

Map manager 130 has a function of managing voxel data; that is, position information and attribute information (specifically, color information indicating a color), on each voxel in a group of voxels arrayed three-dimensionally in association with a space represented by a map (i.e., a map in which a three-dimensional coordinate system representing a space is determined). Map manager 130 is implemented, for example, by a storage medium such as a memory, a communication I/F, a processor which executes a control program, etc., in a computer of position estimation apparatus 100. Voxel data managed by map manager 130 is referred to as map voxel data, and a voxel which has the map voxel data is referred to as a map voxel. Map manager 130 manages map information including map voxel data (position information and color information) on each map voxel in a group of map voxels resulting from partitioning a space.

Map manager 130 manages map information to place the map information in a usable state, and specifically, to hold the map information using a storage medium such as a memory, or to obtain the map information from an external device or the like. Map information is, for example, information generated in advance by measuring a space according to a three-dimensional coordinate system determined in advance. The map information is generated, for example, by measuring a position and an attribute (specifically, a color) of each measurement point in the space, and extracting map voxel data (position information and color information) on each map voxel based on a result of the measurement. The extracting of map voxel data based on the result of the measurement may be performed, for example, using a method same as the method of extracting measurement voxel data on a measurement voxel from measurement point data performed by extractor 120. According to the present embodiment, a data configuration of the map voxel data is assumed to be the same as a data configuration of the measurement voxel data illustrated in FIG. 5. In other words, the map voxel data includes: an index which indicates a location of a map voxel; position information which indicates an average of the results of measuring positions of points (i.e., locations) in a part of a space corresponding to the map voxel; and color information which indicates an average of the results of measuring colors (RGB values) of the points (i.e., locations) in the part of the space corresponding to the map voxel, as attributes which are detected by receiving electromagnetic waves from the points.

(1-1-4. Position Estimator)

Position estimator 140 has a function of estimating a position of mobile object 102 based on the map voxel data (position information and color information as attribute information) of map information managed by map manager 130, according to the measurement voxel data (position information and color information as attribute information) extracted by extractor 120. Position estimator 140 is implemented by, for example, a memory, a processor or the like which executes a control program, in the computer of position estimation apparatus 100.

Position estimator 140 collates the map voxel data on each of the map voxels managed by map manager 130 and the measurement voxel data on each of the measurement voxels extracted by extractor 120. In the collating, position estimator 140 presumptively identifies a transformation operation for transforming position information of the measurement voxel data (position information according to the three-dimensional coordinates used in the measurement of the local space in proximity to mobile object 102) successively into a three-dimensional coordinate system corresponding to a map, such that the position information of the measurement voxel data on a measurement voxel approximates to position information of the map voxel data on a map voxel. A position of mobile object 102 is estimated by identifying the transformation operation. For example, by performing the identified transformation operation on the position information of the measurement voxel data, it is possible to estimate a position of mobile object 102 in the three-dimensional coordinate system in a map.

As a method of estimating a position of mobile object 102; that is, a method of presumptively identifying a transformation operation, for example, a method of repeating processes of predicting, observing, and resampling, using a particle filter, which is known as one technique of Bayesian inference and will be described later, can be used. In general, position estimator 140 calculates a degree of approximation between position information of each of the map voxels managed by map manager 130 and position information of each of the measurement voxels which is transformed using each of a plurality of transformation operations as candidates, and is extracted by extractor 120. Then, position estimator 140 calculates, for each of the plurality of transformation operations, a likelihood based on (i) a highest degree of approximation between the position information of the map voxel and the position information of the measurement voxel among the calculated degrees of approximation and (ii) a highest degree of approximation between the attribute information (i.e., color information) of the map voxel and the attribute information of the measurement voxel among the calculated degrees of approximation. Position estimator 140 estimates a position of mobile object 102 according to a transformation operation corresponding to the highest likelihood calculated among the plurality of transformation operations as candidates, or a transformation operation resulting from performing weighted averaging according to the calculated likelihood. Here, the degree of approximation of position information which indicates a position or the degree of approximation of color information which indicates a color indicates the degree that positions or colors approximate to each other, and indicates a highest value when the positions or the colors are equivalent to each other. Position estimator 140 repeatedly performs the calculation of a likelihood and the estimation of a position of the mobile object, based on the calculation of the degree of approximation according to each of the measurement voxels corresponding to the position information transformed using each of the plurality of transformation operations, and determines a plurality of transformation operations to be used in the next transformation, based on a result of calculating of the likelihood.

(1-2. Operation)

The following describes an operation (i.e., a position estimation method) of position estimation apparatus 100 including the above-described configuration.

(1-2-1. Operation of Extractor)

Figure 6:
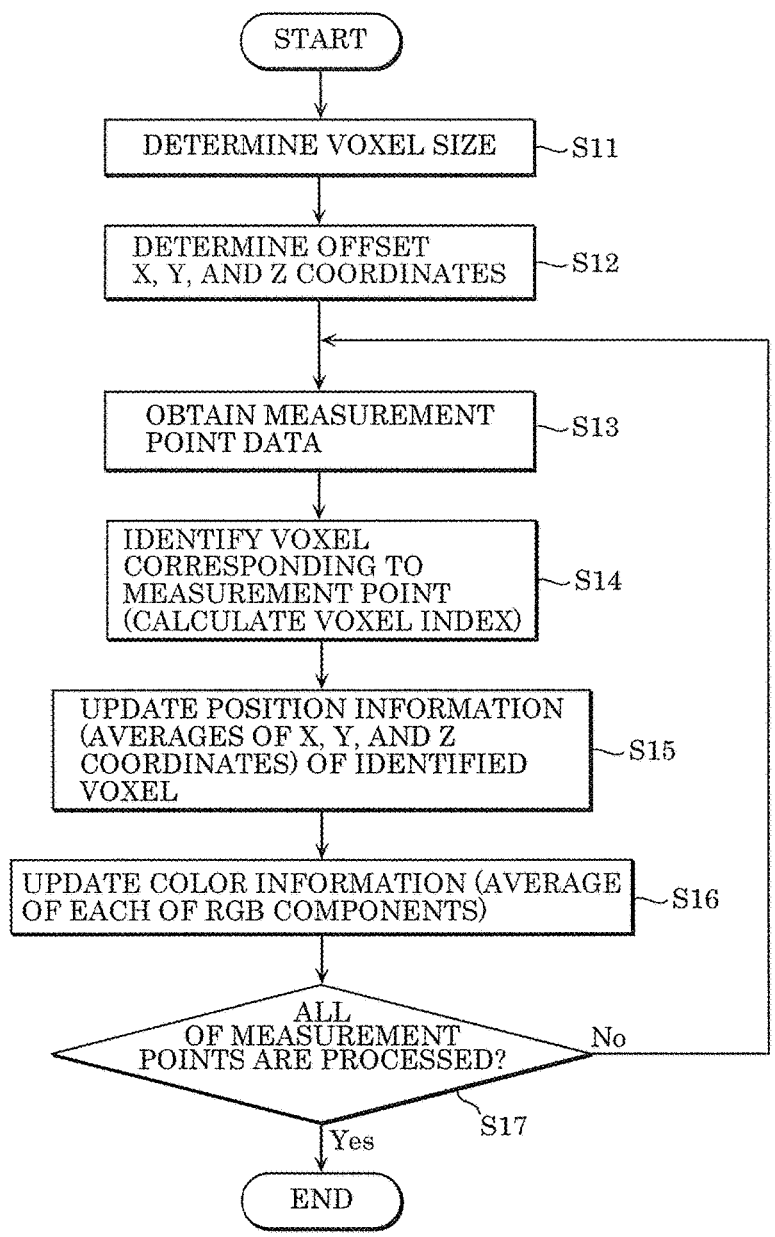
FIG. 6 is a flowchart which illustrates an example of processes of extracting voxel data performed by an extractor of the position estimation apparatus.

FIG. 6 is a flowchart which illustrates an example of processes of extracting measurement voxel data performed by extractor 120. The processes of extracting measurement voxel data will be described with reference to FIG. 6.

Extractor 120 determines a voxel size of a measurement voxel (Step S11). For example, each of the lengths of x, y, and z directions in a three-dimensional coordinate system (xyz three-dimensional coordinate system) used in measurement is determined as a voxel size. In this manner, it is determined, for example, that the measurement voxel has a cubic shape with each side having 1 meter, or the like. In addition, extractor 120 determines offset x, y, and z coordinates which are additional values for use in converting, into indexes, values (x, y, and z coordinate values) in a measurement range in the three-dimensional coordinate system used in measurement of the measurement voxel (Step S12). It should be noted that the voxel size of a measurement voxel need not match a voxel size of a map voxel.

Next, extractor 120 obtains, as a target of processing, measurement point data obtained by measurement by measurement unit 110, on one of measurement points corresponding to a local space in proximity to mobile object 102 (Step S13). Then, extractor 120 identifies a measurement voxel corresponding to the obtained measurement point data (a measurement voxel containing a position corresponding to the measurement point data), and calculates an index of the measurement voxel (Step S14). For example, an index of the measurement voxel is calculated by Expression 1 to Expression 3 indicated below, using a coordinate value of the measurement point data. The index is a number indicating a location in the three-dimensional array, of each measurement voxel included in a group of measurement voxels three-dimensionally arrayed in a local space.

$x(\text{index}) = (x \text{ coordinate of a measurement point} + \text{offset } x \text{ coordinate})/\text{voxel size}$ (Expression 1)

$y(\text{index}) = (y \text{ coordinate of a measurement point} + \text{offset } y \text{ coordinate})/\text{voxel size}$ (Expression 2)

$z(\text{index}) = (z \text{ coordinate of a measurement point} + \text{offset } z \text{ coordinate})/\text{voxel size}$ (Expression 3)

Next, extractor 120 updates position information of the measurement voxel identified in Step S14, using a position of the measurement point data obtained in Step S13 (Step S15). In addition, extractor 120 updates color information of the measurement voxel identified in Step S14, using a color (RGB value) of the measurement point data obtained in Step S13 (Step S16). With the processes in Step S15 and Step S16 described above, measurement voxel data (position information and color information) as illustrated in 5, which is temporarily held by a storage medium such as a memory, is updated. Then, the processes of Step S13 to Step S16 are repeated by targeting measurement point data not yet processed as targets for the processes, until all of the measurement point data are processed as the targets (Step S17).

It should be noted that, every time a group of measurement point data on each of the measurement points (for example, each of the measurement points in the entire circumference in a horizontal direction, etc.) in a local space in proximity to mobile object 102 is obtained by measurement unit 110, the extraction processing (Step S11 to Step S17) or part of the extraction processing in Step S13 to Step S17 may be performed. As described above, in the case where extractor 120 extracts measurement voxel data (position information and color information) on each measurement voxel after a group of measurement point data of a certain amount are obtained, an average of positions of measurement point data on measurement points located in each of the measurement voxels may be regarded as position information of the measurement voxel, and an average of colors (RGB values) of the measurement point data may be regarded as color information of the measurement voxel. The position of a measurement voxel (for example, x coordinate, y coordinate, and z coordinate at a vertex that corresponds to a minimum position in the measurement voxel) can be identified, based on the index, by Expression 4 to Expression 6 indicated below.

$$x \text{ coordinate of a measurement voxel} = x(\text{index}) x \text{ voxel size} - \text{offset } x \text{ coordinate} \quad \text{(Expression 4)}$$

$$y \text{ coordinate of a measurement voxel} = y(\text{index}) x \text{ voxel size} - \text{offset } y \text{ coordinate} \quad \text{(Expression 5)}$$

$$z \text{ coordinate of a measurement voxel} = z(\text{index}) x \text{ voxel size} - \text{offset } z \text{ coordinate} \quad \text{(Expression 6)}$$

(1-2-2. Operation of Position Estimator)

Position estimator 140 collates the map voxel data on each of the map voxels and the measurement voxel data on each of the measurement voxels. More specifically, position estimator 140, such that position information of measurement voxel data on a measurement voxel represented by a three-dimensional coordinate system for measurement, which is obtained by measuring a local space in the vicinity of mobile object 102 approximates to position information of map voxel data on a map voxel that is represented by a three-dimensional coordinate system for a map and has a limitation posed at some point, presumptively identifies a transformation operation for transforming the position information of the measurement voxel data successively into a three-dimensional coordinate system corresponding to a map, thereby estimating a position based on the estimated transformation operation.

For that reason, position estimator 140 performs position estimation processing in which the processes of predicting, observing, and resampling are repeated, using a particle filter. The particle filter is a technique of predicting a posterior probability from a prior probability and calculating of a likelihood (likelihood calculation), using Bayes' theorem. A probability is represented by a particle that is a hypothesis and a likelihood. Position estimator 140 uses particles as a means of estimating a transformation operation having a high likelihood as a transformation operation for transforming position information of measurement voxel data into a three-dimensional coordinate system corresponding to a map, such that position information of measurement voxel data on a measurement voxel approximates to position information of map voxel data of a map voxel. A transformation operation is identified for each of the particles. A position of mobile object 102 is estimated by the estimated transformation operation.

Figure 7:
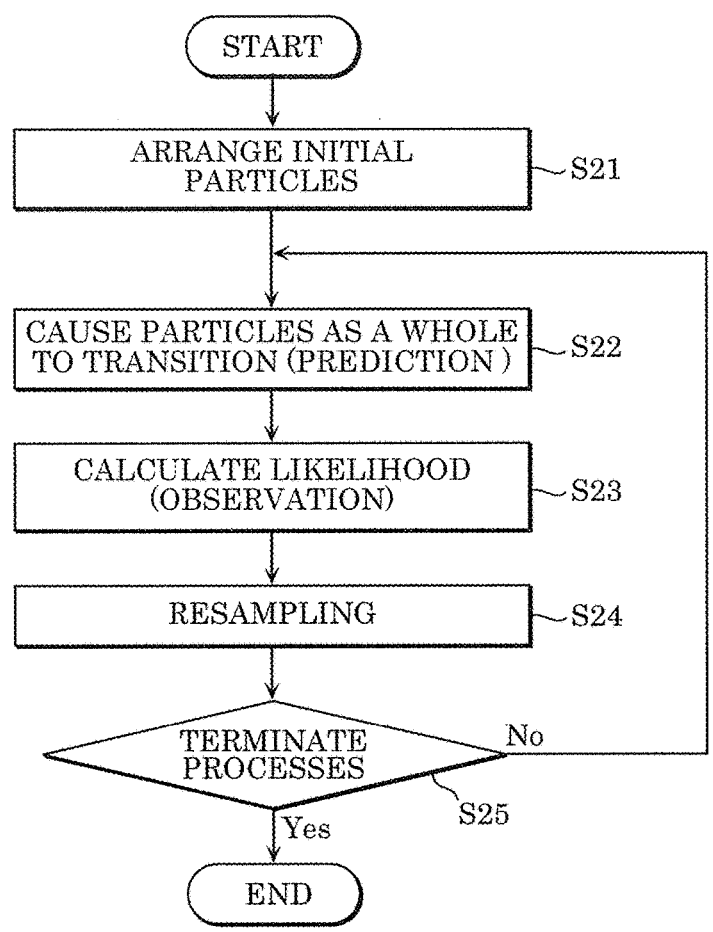
FIG. 7 is a flowchart which illustrates an example of position estimation processes performed by a position estimator of the position estimation apparatus.
Figure 8:
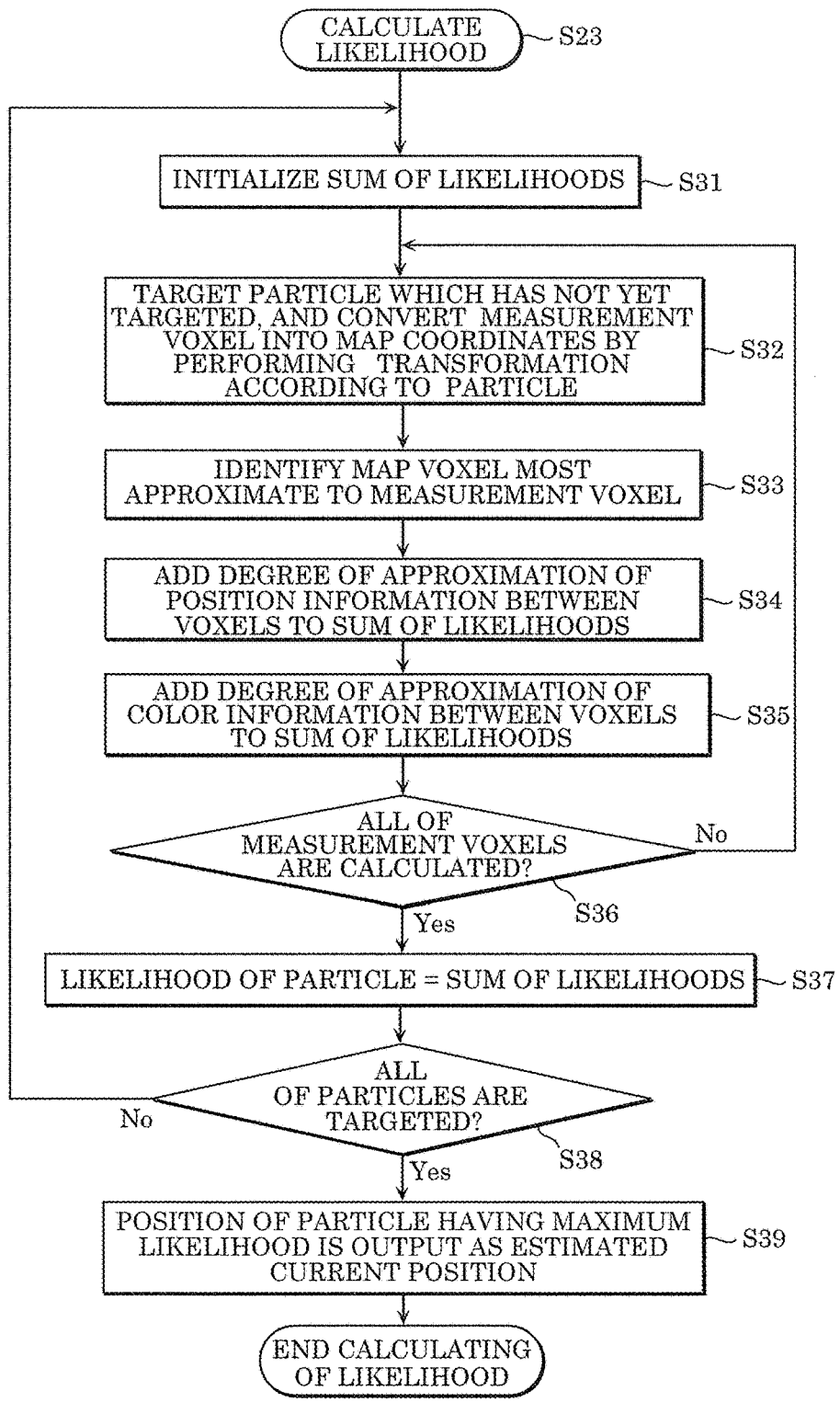
FIG. 8 is a flowchart which illustrates an example of calculating a likelihood which is part of the position estimation processes performed by the position estimator.

FIG. 7 is a flowchart which illustrates an example of position estimation processes performed by position estimator 140, and FIG. 8 is a flowchart which illustrates an example of calculation of a likelihood that is part of the position estimation processes. The position estimation processes will be described with reference to FIG. 7 and FIG. 8.

Position estimator 140, first, arranges initial particles as position estimation processes in which a particle filter is used (Step S21). Position estimator 140, next, repeats a prediction process (Step S22) for causing the particles as a whole to transition, an observation process (Step S23) for calculating a likelihood of a predicted particle, and a resampling process (Step S24) (resampling of a particle). Position estimator 140 terminates the repeating of the processes when predetermined interruption conditions are satisfied, such as when position estimation is no longer required (Step S25).

Figures 9, 10:
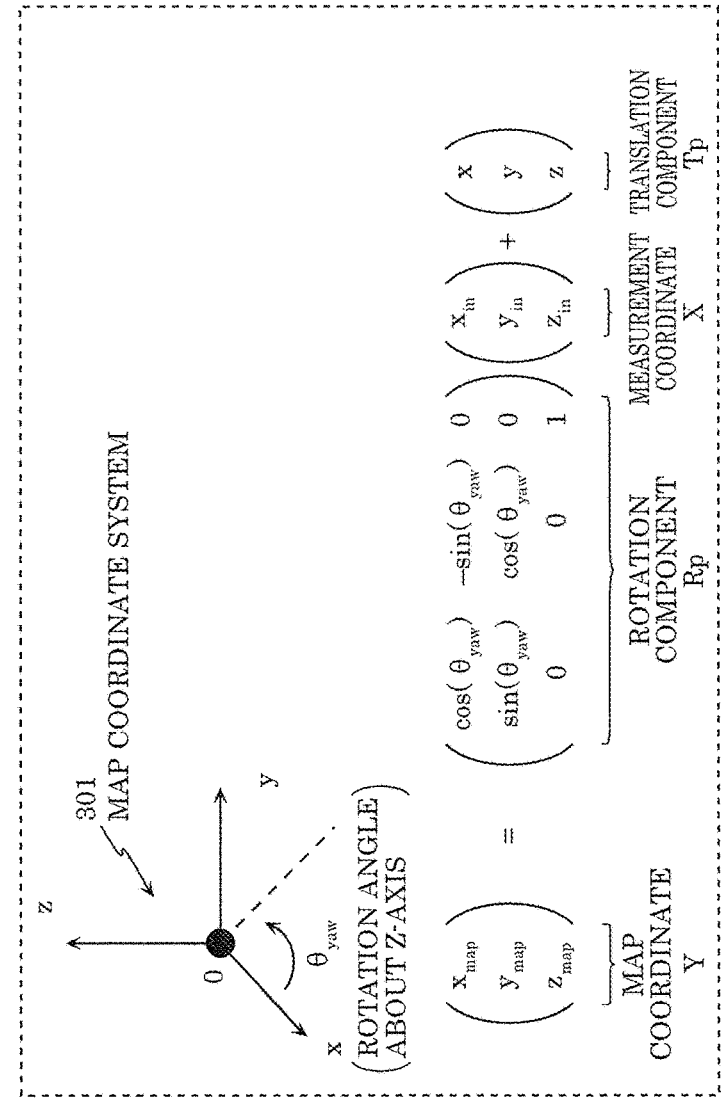
FIG. 9 is a diagram which illustrates an example of particle data used in the position estimation processes performed by the position estimator.
FIG. 10 is a conceptual diagram which illustrates a transformation operation for transforming measurement coordinates corresponding to position information of the measurement voxel into map coordinates, using particle data.

FIG. 9 is a diagram which illustrates an example of particle data that is information related to a particle used in the position estimation processes. Position estimator 140 causes a storage medium such as a memory to store particle data per particle, as illustrated in FIG. 9. Particle data indicates three-dimensional coordinates and a rotation angle of a particle. As illustrated in FIG. 9, a storage region of particle data in a storage medium stores three-dimensional coordinates (x coordinate, y coordinate, and z coordinate) of a particle corresponding to a three-dimensional coordinate system of a map, a rotation angle θyaw of which a z-axis is a rotation center axis, and a likelihood of the particle. A vehicle or a vehicle-type robot is assumed here as mobile object 102, for convenience, and thus a rotation component is expressed one-dimensionally. However, the rotation component may be expressed by a three-dimensional component such as roll, pitch, yaw, etc.

FIG. 10 is a conceptual diagram which illustrates a transformation operation or transforming a measurement coordinate according to position information of a measurement voxel into a map coordinate, using particle data. As illustrated in FIG. 10, a three-dimensional measurement coordinate X that is a position indicated by position information of measurement voxel data is converted to a map coordinate Y in map coordinate system 301 (a three-dimensional coordinate system of a map), by a transformation operation in which a translation component Tp based on a three-dimensional coordinates (x coordinate, y coordinate, and z coordinate) of a particle and a rotation component Rp based on a rotation angle θyaw of the particle are used.

The following describes in detail each of the processes of the above-described Step S21 to Step S24.

The arrangement of initial particles in Step S21 illustrated in FIG. 7 is implemented by generating initial particles in each of which each of the components (x coordinate, y coordinate, z coordinate, and rotation angle θyaw) of a particle is determined by a random number so as to fall within a range of values that the particle can take. When a transformation operation for converting position information of measurement voxel data into map coordinate system 301 based on a particle (each component of a particle), the range of values that the particle can take corresponds to a range of values that position information of the measurement voxel data can take at least during the position estimation processes (i.e., a range in which mobile object 102 possibly moves in a space represented by a map). In Step S21, for example, 1000 positions (coordinate x, coordinate y, and coordinate z) are calculated by random numbers, and 72 variations of rotation angle θyaw are generated by varying rotation angle θyaw by 5 degrees for each of the positions, thereby generating a total of 72000 particles each having x coordinate, y coordinate, z coordinate, and rotation angle θyaw.

In addition, in the case where, regarding a position of mobile object 102, position information obtained using a global positioning system (GPS) receiver or the like or previous position information such as position information of the past can be used, initial particles may be arranged in proximity to the position indicated by the previous position information.

The prediction for causing the particles as a whole to transition in Step S22 is implemented by generating a particle at time t, by calculating movement vector my based on movement of a particle (displacement of a particle component) between time t−2 and time t−1 where a current time is time t, adding movement vector my to the particles as a whole at time t−1, and further adding observation noise approximated using gauss distribution or the like to each of the particles.

In addition, when odometry information such as the number of rotations of a wheel, etc., or a steering angle is available, the odometry information may be used instead of the movement vector.

Figure 11:
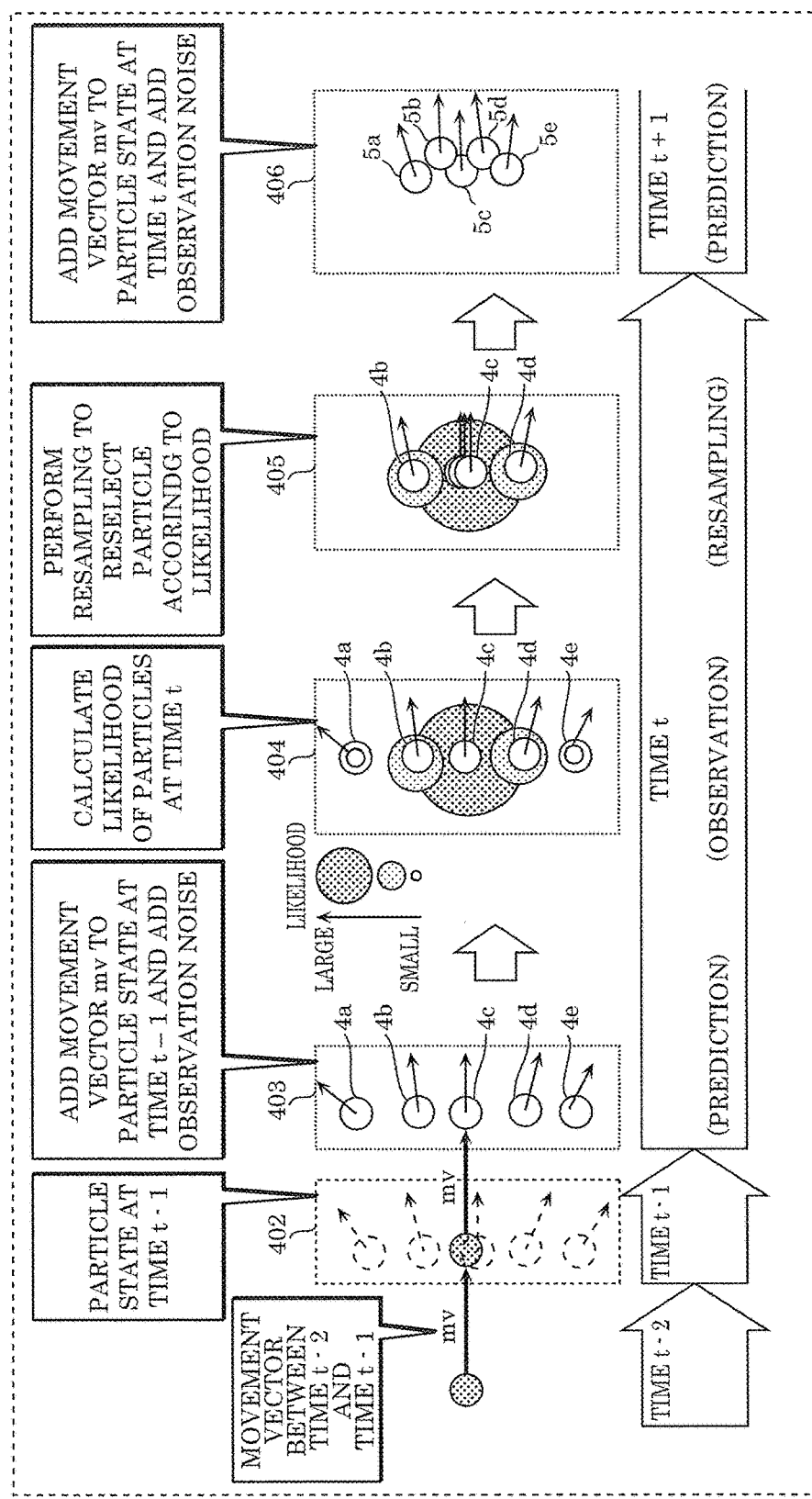
FIG. 11 is a conceptual diagram which illustrates prediction, observation (calculation of a likelihood), and resampling, using particle data in the position estimation processes.

FIG. 11 illustrates a state in which particle state 402 at time t−1 is changed to particle state 403 at time t as a result of adding movement vector my and adding observation noise, according to prediction in Step S22.

The following describes observation for calculating a likelihood of a particle in Step S23, with reference to FIG. 8. Position estimator 140, first in calculating a likelihood (observation), initializes a sum of likelihoods as data (variable) for calculating a likelihood (Step S31).

Next, position estimator 140 sequentially targets each of the particles transitioned in Step S22, and collates each of a plurality of measurement voxels to which a transformation operation according to a target particle is applied, with a map voxel, thereby calculating a likelihood of the particle (Steps S32 to S38).

First, one particle which has not yet targeted in calculating a likelihood is targeted, and one of a plurality of measurement voxels from which extractor 120 extracted measurement voxel data is targeted. A transformation operation (see FIG. 10) according to the target particle is performed to convert position information included measurement voxel data of the target measurement voxel into map coordinates of map coordinate system 301 (Step S32).

Next, position estimator 140 identifies a map voxel corresponding to map voxel data including position information having a highest degree of approximation to the position information of the measurement voxel data converted to the map coordinates of the target measurement voxel (Step S33). The degree of approximation between position information and position information increases as the positions indicated by the position information are more approximate to each other (as a distance between the positions is shorter). In Step S33, based on a position of a measurement voxel (i.e., an average of three-dimensional coordinates indicated by position information of measurement voxel data), position estimator 140 identifies, a map voxel corresponding to map voxel data including position information indicating a position most approximate to a position of the measurement voxel, among map voxel data managed by map manager 130.

As an example, position estimator 140 calculates an index of a map voxel based on coordinate values of position information in the map coordinates converted in Step S32, using Expression 1 to Expression 3.

Figure 12:
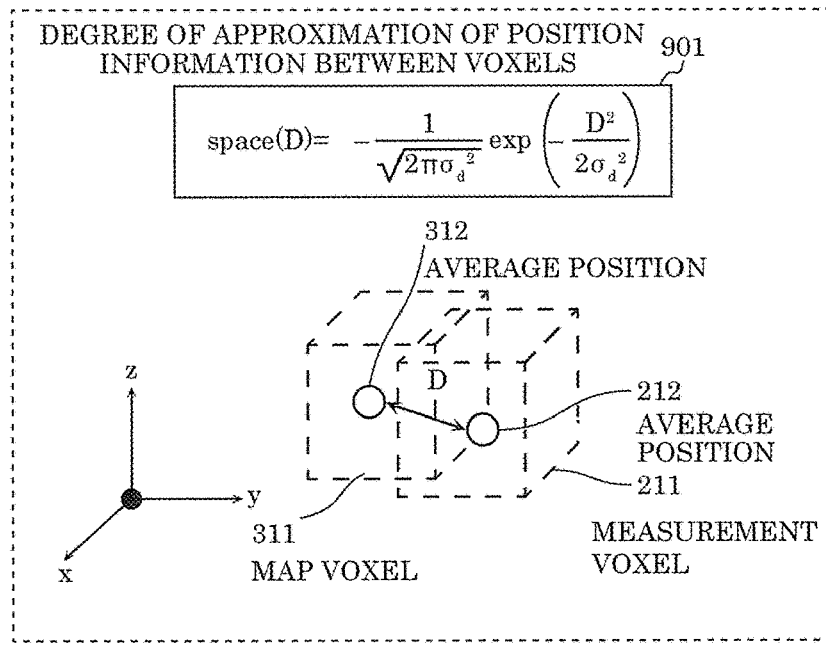
FIG. 12 is a diagram which illustrates an example of calculating the degree of approximation of position information of voxels.

Next, position estimator 140 calculates a degree of approximation between position information of the map voxel data of the map voxel identified in Step S33 and position information of the measurement voxel data of the measurement voxel which is currently a target, and add the degree of approximation to the sum of likelihood (Step S34). The degree of approximation of position information of the voxels (i.e., the identified map voxel and the target measurement voxel which is currently a target) can be calculated based on a math formula or the like determined in advance such that the degree of approximation increases with decreasing distance D between the positions (three-dimensional coordinates) indicated by the both position information. FIG. 12 illustrates an example of calculating the degree of approximation for calculating space (D), as a degree of approximation, based on distance D between average position 312 indicated by position information of map voxel 311 and average position 212 indicated by position information of measurement voxel 211. Position estimator 140, for example, may calculate, as space (D), the degree of approximation of position information indicating positions with an interval of distance D, as Expression 901 indicated in FIG. 12.

Next, position estimator 140 calculates a degree of approximation between color information of the map voxel data of the map voxel identified in Step S33 and color information of the measurement voxel data of the measurement voxel which is currently a target, and adds the degree of approximation to the sum of likelihoods (Step S35). The degree of approximation of color information of the voxels (i.e., the identified map voxel and the measurement voxel which is currently a target) can be calculated, for example, based on a math formula or the like determined in advance such that the degree of approximation increases with decreasing distance C in an RGB three-dimensional coordinate system between the colors (an average value of colors that is an RGB value, that is, an average color) indicated by the both color information.

Figure 13:
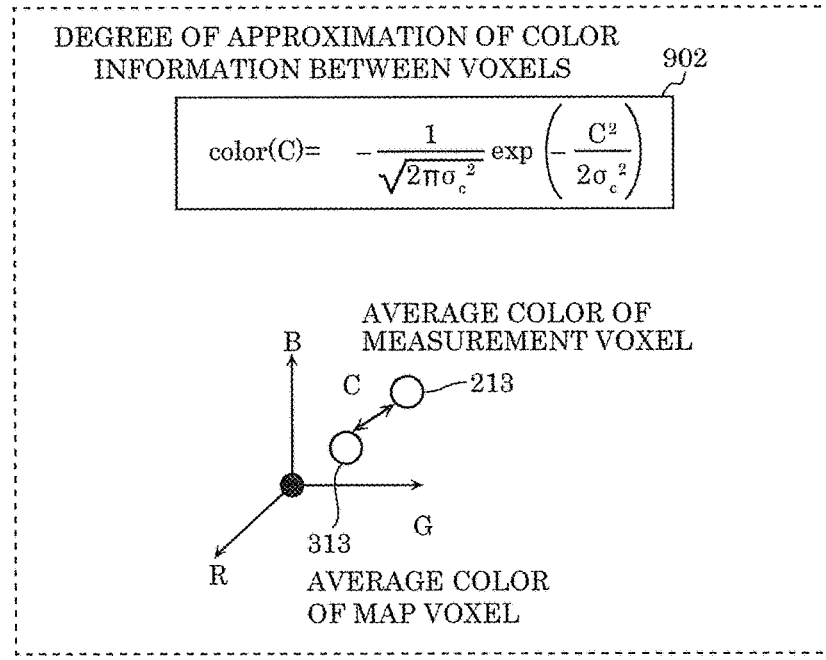
FIG. 13 is a diagram which illustrates an example of calculating a degree of approximation of color information of voxels.

FIG. 13 illustrates an example of calculating the degree of approximation for calculating color (C), as a degree of approximation, based on distance C between average color 313 indicated by color information of a map voxel and average color 213 indicated by color information of a measurement voxel. Position estimator 140, for example, may calculate, as color (C), the degree of approximation of color information indicating each color (RGB value) with an interval of distance C, as Expression 902 indicated in FIG. 13. It should be noted that, the degree of approximation of position information is added to the sum of likelihoods in Step S34, and the degree of approximation of color information is added to the sum of likelihoods in Step S34. However, these are mere examples of processes for finally calculating a likelihood per a particle based on correlation related to position information and color information between the map voxel and the measurement voxel. Instead of adding the degree of approximation of position information and the degree of approximation of color information to the sum of likelihoods in Step S34 and Step S35, for example, a result of multiplying the degree of approximation of position information by the degree of approximation of color information may be added to the sum of likelihoods, or for example, in order to differentiate a weight of influence on a likelihood between the position information and the color information, a degree of approximation of position information which is multiplied by a coefficient and a degree of approximation of color information, may be added to the sum of likelihoods.

Next, whether or not performing the processes according to Step S32 to Step S35 is completed by targeting all of the measurement voxels is determined (Step S36). The process returns to Step S32 when the processes are not completed, and the sum of likelihoods is stored, as the likelihood of a particle which is currently targeted, in the storage region of the likelihood of the particle data (see FIG. 9) when the processes are completed (Step S37).

Next, whether or not performing the processes of calculating a likelihood is completed by targeting all of the particles is determined (Step S38). The process returns to Step S31 when the processes are not completed, and information indicating a current position of mobile object 102 (i.e., a result of the position estimation) is output based on the transformation operation according to a particle having the highest likelihood when the processes are completed (Step S39). For example, the result of the position estimation is obtained by providing, as position information of the measurement voxel, zero to the transformation operation. Alternatively, the components of particle data having the highest likelihood may be simply output as a current position.

When the transformation operation indicated in FIG. 10 is used in Step S32, position estimator 140 outputs, as a result of the position estimation, components (three-dimensional coordinates and a rotation angle) of a particle indicated by the particle data of a particle having the highest likelihood in Step S39. It should be noted that in Step S39, position estimator 140 may output, as a result of the position estimation, a result of performing weighted averaging according to the likelihood of a particle for the components (three-dimensional coordinates and a rotation angle) of each of the particles, instead of outputting the components of a particle having the highest likelihood. The likelihood of each of the particles is divided by the sum of likelihood of particles as a whole, and is normalized, thereby obtaining a weighted average. Outputting of the information indicating a result of the position estimation (a position of mobile object 102) performed by position estimator 140 in Step S39 is carried out by, for example, transmitting the information to a device provided to mobile object 102 (for example, a control mechanism which performs drive control on a wheel for movement), displaying the information on a display device mounted on mobile object 102, transmitting the information to a device that is separated from mobile object 102, or the like. The result of the position estimation is used as a result of the outputting. In addition, the likelihood of particle data of each of the particles (see FIG. 9) is used in resampling in Step S24.

Next, in Step S24 of FIG. 7, resampling is performed using a result of observation (calculation of a likelihood) of particles in Step S23, and determining a probability of selecting the particle again according to the likelihood of a particle.

The following describes the resampling with a simple example using three particles. In the case where particles before resampling are (1, 0.5), (2, 0.3), (3, 0.2) when represented by (a particle number, a likelihood), a sum of likelihoods of all of the particles is 1.0, as a result of 0.5+0.3+0.2. In this case, sampling is performed by selecting a particle using a random number, such that the particle of particle number 1 is selected with a probability of 0.3/1.0; that is, 30%, the particle of particle number 3 is selected with a probability of 0.2/1.0; that is, 20%. It should be noted that the number of particles selected in sampling may be fixed, or may be varied every time the resampling is carried out, for example, according to dispersion of likelihoods of all of the particles, by reducing the number of particles with less dispersion, for example.

Particles 4a to 4e in particle state 404 illustrated in FIG. 11 each indicate the likelihood as a result of the observation in Step S23, by the size of a circle. Particle state 405 indicates an example in which particle 4a and particle 4e having a relatively low likelihood (being small) as illustrated in particle state 404 are low in the probability of being selected again by resampling in Step S24, and resultantly are not selected by a random number. In addition, particle state 405 indicates an example in which particle 4c having a relatively high likelihood (being large) as illustrated in particle state 404 is high in the probability of being selected, and resultantly three particles 4c are selected by a random number in the resampling in Step S24. In addition, particle state 405 indicates an example in which particle 4b and 4d having a medium likelihood as illustrated in particle state 404 is medium in the probability of being selected, and resultantly are selected by a random number in the resampling in Step S24. Observation noise is added to the particles after resampling that is performed at time t, by the prediction in Step S22 at time t+1, and the particles result in particles 5a to 5e as illustrated in particle state 406, for example. It should be noted that the time indicated as time t+1, time t, and time t+1 in FIG. 11 may advance by 1 every time Step S22 to Step S24 in FIG. 7 are repeated, for example, or may advance by 1 every time Step S22 to Step S24 in FIG. 7 are repeated for predetermined times.

In addition, for example, the measurement voxel data used in the observation in Step S23 may be the same as or different from the measurement voxel data used in the observation of previously performed Step S23, according to the relationship of a cycle of repeatedly obtaining a group of measurement point data by measurement unit 110 and a cycle of repeating Step S22 to Step S24. For example, the cycle of repeatedly obtaining a group of measurement point data by measurement unit 110 and the cycle of repeating Step S22 to Step S24 may be matched so that the measurement voxel data used in the observation in Step S23 can be different from the measurement voxel data used in the observation of previously performed Step S23.

(1-3. Advantageous Effect, Etc.)

With the above-described position estimation apparatus 100, not only a position but also a color is measured, and position estimation is performed using color information in addition to a position of a voxel, and thus it is highly possible that a position of a mobile object can be promptly and properly estimated even in an environment where structures having similar shapes are consecutively disposed.

(1-4. Modification Examples)

The following describes modification examples in which the above-described position estimation apparatus 100 is partially modified.

(1-4-1. Modification 1: Example of Position Information Indicating a Plane)

The above-described measurement voxel data and map voxel data each include position information indicating a position represented by three-dimensional coordinates, x coordinate, y coordinate, and z coordinate, (an average of positions of points in a voxel) (see FIG. 5). It is described that the calculation of the degree of approximation of position information in Step S34 illustrated in FIG. 8 can be carried out based on distance D between positions (average positions) indicated by the respective position information, for example.

As a modification example, one of the measurement voxel data and the map voxel data may be information indicating a plane corresponding to a voxel. In this example, the calculation of the degree of approximation between position information and position information in Step S34 may be carried out based on distance D between (i) an average position indicated by one of the position information and the position information (an average of positions); that is, a point, and (ii) a plane indicated by the other. In addition, the calculation of the degree of approximation between position information and position information in the case where a map voxel most approximate to a measurement voxel in Step S33 may also be carried out based on distance between a point and a plane. For example, when measurement voxel data is the measurement voxel data exemplified in FIG. 5, map voxel data may be the map voxel data exemplified in FIG. 14. The map voxel data illustrated in FIG. 14 includes, as position information, averages of the three-dimensional coordinates measured for each point in a map voxel, and a first eigen vector and a second eigen vector calculated based on a 3×3 (3 rows and 3 columns) variance-covariance matrix based on the variance of the averages. Since a plane can be identified according to the first eigen vector and the second eigen vector, calculation using distance D between a point and a plane can be performed, for example, as calculation of the degree of approximation between position information of the measurement voxel data and position information of the map voxel data. In addition, the 3×3 (3 rows and 3 columns) variance-covariance matrix itself may be included as position information in the voxel data, instead of the first eigen vector and the second eigen vector.

According to this modification example, the position information included in the measurement voxel data on a measurement voxel corresponding to a local space, which is extracted by extractor 120, or the position information included in the map voxel data on a map voxel corresponding to a space, which is managed by the map manager, indicates a plane identified by the variance-covariance matrix determined based on the position of each point in the voxels. In this manner, position estimator 140 identifies the degree of approximation between the position information of map voxel data and the position information of the measurement voxel data according to a distance between (i) an average of positions indicated by one of the position information and the position information and (ii) a plane indicated by the other. In this manner, position estimator 140 is capable of calculating the above-described likelihood (i.e., a likelihood of a particle and a likelihood of a transformation operation).

As described above, there is a possibility that use of position information indicating a plane in voxel data enables position estimation apparatus 100 to perform position estimation with higher accuracy.

It should be noted that, assuming the case where a group of points in a voxel is not an ideal plane, a degree of flatness may be estimated when calculating the eigen value and the eigen vector based on the variance-covariance matrix. For example, the group of points in a voxel may be estimated as an ideal plane when the first and second eigen values are relatively large, and a third eigen value is relatively small, and thus distance D between a point and a plane may be used. However, since there is a possibility that the group of points in a voxel is sphere or stereoscopic when the difference between the second eigen value and the third eigen value is small, a distance between a point and a point may be used.

In addition, when the degree of approximation between position information of map voxel data and position information of measurement voxel data is calculated based on a distance between a point and a plane, weighting may be performed according to a degree of flatness. Furthermore, the plane and the degree of flatness of each voxel calculated in advance based on the variance-covariance matrix may be included in the map voxel data. Accordingly, map manager 130 may further manage the degree of flatness as map voxel data.

(1-4-2. Modification 2: Example of Color Information Indicating Color Histogram)

The above-described measurement voxel data and map voxel data each include color information indicating a color represented by an RGB value (average of colors of points in a voxel) (see FIG. 5). It is described that the calculation of the degree of approximation of color information in Step S35 illustrated in FIG. 8 can be carried out based on distance C in the RGB three-dimensional coordinate system between colors (average color) indicated by the respective color information, for example.

Here, a modification example in which the color information is information (histogram) resulting from segmenting color into bins which are a plurality of categories, and the degree of approximation of color information is calculated based on a similarity of histograms will be described. In this case, voxel data (measurement voxel data and map voxel data) is voxel data exemplified in FIG. 15. In the example of FIG. 15, color information included in voxel data indicates distribution (i.e., normalized degree) in which R components, G components, and B components of 8-bit RGB values are segmented to bins each having 64 gradations.

Figure 16:
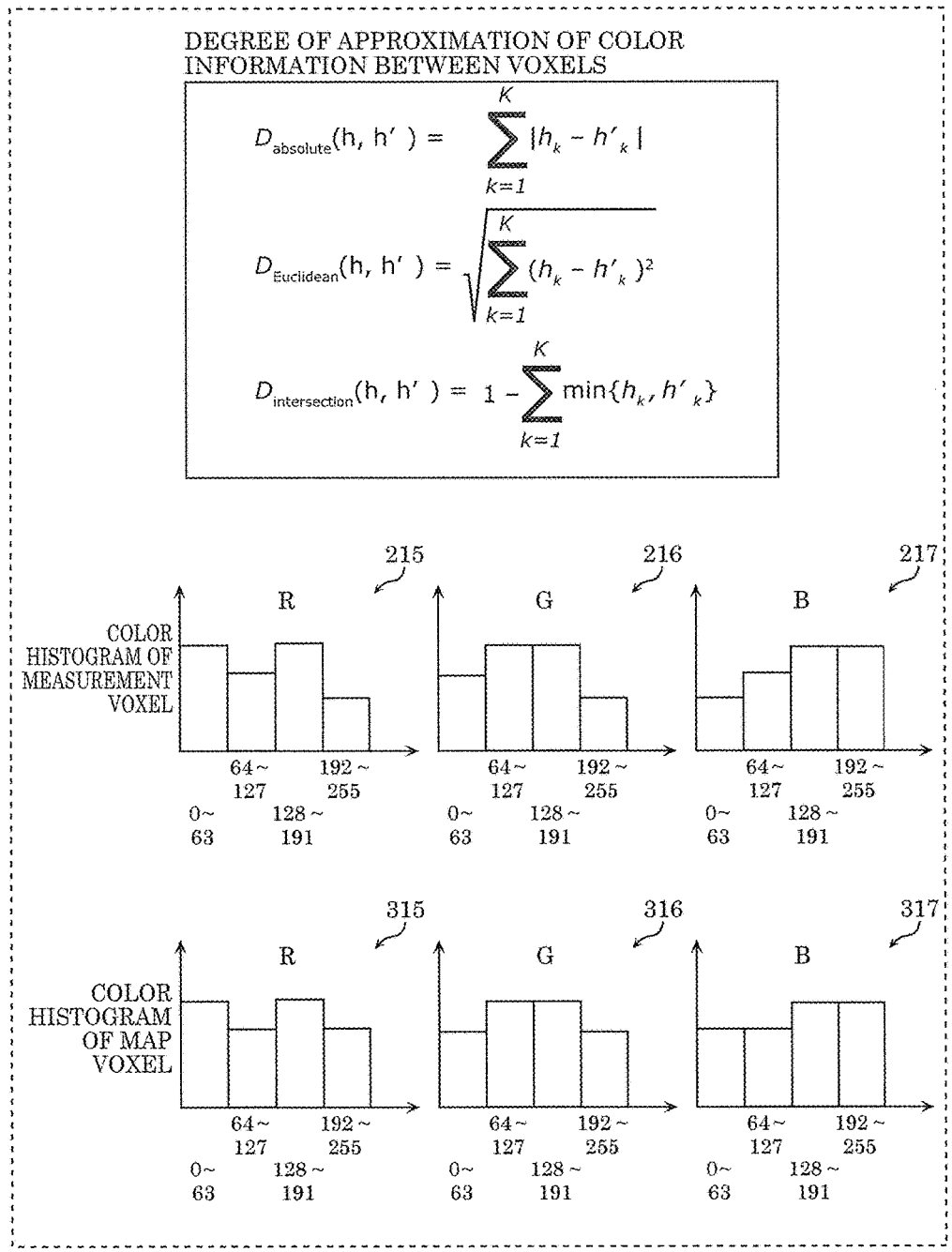
FIG. 16 is a diagram which illustrates an example of calculating a degree of approximation of color information of voxels according to Modification 2 of Embodiment 1.

FIG. 16 indicates an example of calculating the degree of approximation of color information. An existing method of comparing histograms such as $D_{absolute}(h, h')$, $D_{Euclidean}(h, h')$, $D_{intersection}(h, h')$, or the like as illustrated in FIG. 16 (i.e., a method of using a Euclidean distance, a histogram intersection methods, etc.), for example, can be used to calculate the degree of approximation of color information based on histogram h of color information in the measurement voxel data and histogram h' of color information in the map voxel data. It should be noted that the histogram of color information included in the measurement voxel data is a combination of histogram 215 of R components, histogram 216 of G components, and histogram 217 of B components. In addition, the histogram of color information included in the map voxel data is a combination of histogram 315 of R components, histogram 316 of G components, and histogram 317 of B components.

According to this modification example, extractor 120 extracts measurement voxel data by determining, for each measurement voxel, attribute information (specifically, color information) on the measurement voxel in such a manner that the attribute information indicates a histogram based on attribute (color) of each point in the voxel, which is measured by measurement unit 110, is indicated. The attribute information (specifically, color information) on a map voxel managed by map manager 130 indicates a histogram, of a plurality of points in a portion of a space corresponding to the map voxel, which is based on attributes (color) obtained by receiving electromagnetic waves from the plurality of points. In this manner, position estimator 140 identifies the degree of approximation of the attribute information (specifically, color information) according to a distance between a histogram indicted by one of the attribute information and a histogram indicated by the other. In this manner, position estimator 140 is capable of calculating the above-described likelihood (i.e., a likelihood of a particle and a likelihood of a transformation operation).

(1-4-3. Modification 3: Example of Color Information Indicating Local Autocorrelation)

The following describes a modification example in which color information included in voxel data on a voxel is represented by a feature vector which indicates concentration tendency (i.e., local autocorrelation) correlated to a local position in the voxel.

Figure 17:
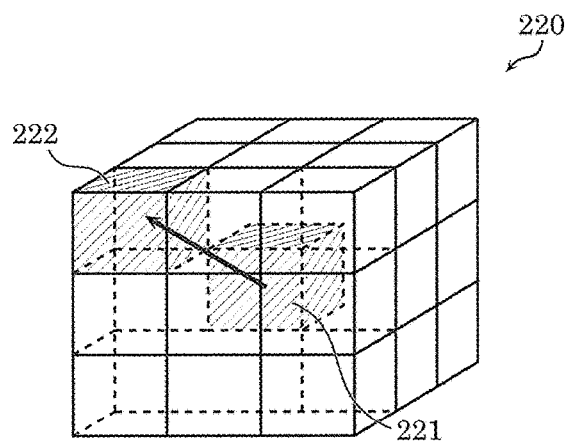
FIG. 17 is a diagram which illustrates a sub voxel used in extracting color information of voxels according to Modification 3 of Embodiment 1.

FIG. 17 is a diagram which illustrates a sub voxel used in extracting color information on a voxel. As illustrated in FIG. 17, voxel 220 is partitioned into 3×3×3 sub voxels, that is a total of 27 sub voxels. Then, an average is calculated for each component of a color (RGB value) of each point (measurement point) in each of the sub voxels, and is normalized so as to take a value within a range from 0 to 1, for example. Then, for each component of R, G, and B, an average of the color of sub voxel 221 located at the center of voxel 220 is calculated, and for each direction from sub voxel 221 toward each of the sub voxels other than sub voxel 221 (for example, sub voxel 222), a multiplication of a color of the sub voxel in the direction is calculated. Color information includes three components of RGB, and 27 sub voxels are present. Accordingly, feature vectors of 3×27=81 dimensions are generated. The feature vector of 81 dimensions represents color information included in voxel data on voxel 220.

According to this modification example, extractor 120 extracts measurement voxel data by determining, for each measurement voxel, attribute information (specifically, color information) on the measurement voxel in such a manner that the attribute information indicates a correlation of each point in the measurement voxel between a position and attribute (color) which are measured by measurement unit 110. In addition, the attribute information (specifically, color information) on each of the map voxels managed by map manager 130 indicates a correlation between a position and attribute (color) obtained by receiving electromagnetic waves, on a plurality of points in a portion of a space corresponding to the map voxel.

As described above, in the case where color information included in voxel data (measurement voxel data and map voxel data) is represented by a feature vector indicating local autocorrelation of a color in the voxel, the calculation of the degree of approximation of color information in Step S35 illustrated in FIG. 8 can be carried out, for example, by operation (see, for example, FIG. 12) which determines a degree of approximation such that the degree of approximation increases with decreasing distance, based on Euclidean distance between the feature vectors each having 81 dimensions.

In addition, by changing the scale from the above-described modification example; that is, by replacing the sub voxels in the above-described example with voxels, color information included in voxel data on a voxel may be represented by a feature vector which indicates concentration gradient (i.e., local autocorrelation) correlated to a local position in a local group of voxels (a plurality of adjacent voxels) including the voxel. More specifically, for each of a voxel (here, voxel A) and 26 adjacent voxels surrounding voxel A, an average is calculated for each component of a color (RGB value) of each point (measurement point) in the voxel, and is normalized so as to take a value within a range from 0 to 1, for example. Then, for each component of R, G, and B, an average of the color of voxel A is identified, and for each direction from voxel A toward each of adjacent voxels other than voxel A, a multiplication of a color of a voxel in the direction is identified. The feature vector of 81 dimensions having all of the identified values as components represents color information included in voxel data on voxel A.

According to this example, extractor 120 extracts measurement voxel data by determining, for each measurement voxel, attribute information (specifically, color information) on the measurement voxel in such a manner that the attribute information indicates a correlation of each point in the voxel and one or more voxels adjacent to the voxel, between a position and attribute (color) which are measured by measurement unit 110. In addition, the attribute information (specifically, color information) on each of the map voxels managed by map manager 130 indicates a correlation, on a plurality of points in a portion of a space corresponding to the voxel and a portion of a space corresponding to the one or more voxels adjacent to the voxel, between a position and attribute (color) obtained by receiving electromagnetic waves.

As described above, in the case where color information included in voxel data (measurement voxel data and map voxel data) is represented by a feature vector indicating local autocorrelation of a color in a local group of voxels, the calculation of the degree of approximation of color information in Step S35 illustrated in FIG. 8 can be carried out, for example, by operation (see, for example, FIG. 12) which determines a degree of approximation such that the degree of approximation increases with decreasing distance, based on Euclidean distance, between the feature vectors each having 81 dimensions.

There is a possibility that use of color information indicating local autocorrelation in voxel data enables position estimation apparatus 100 to perform position estimation with higher accuracy.

(1-4-4. Modification 4: Example of Not Using Color Information in Rough Position Estimation)

In the above-described embodiment, position estimator 140 calculates a degree of approximation between position information of measurement voxel data and position information of map voxel data in Step S34, and further calculates a degree of approximation between attribute information (specifically, color information) of measurement voxel data and attribute information of map voxel data in Step S35, always in the observation in Step S23. However, in rough position estimation, a likelihood of a particle may be obtained by only calculating a degree of approximation of position information, and only in fine position estimation, a likelihood of a particle may be obtained based on a degree of approximation of color information in addition to the degree of approximation of position information. In this manner, it is possible to efficiently perform the position estimation. For example, a likelihood of a particle may be obtained by only the degree of approximation of position information at the first time in repeating of prediction, observation, and resampling in Step S22 to Step S24, and at the second and subsequent times in the repeating, a likelihood of a particle may be obtained based on the degree of approximation of attribute information (specifically, color information) in addition to the degree of approximation of position information, under a predetermined condition. The predetermined condition may be, for example, a condition determined by the times of the repeating, or may be a condition that the likelihood calculated by the previous observation exceeds a predetermined threshold.

(1-4-5. Modification 5: Example of Distinguishing Specified Color)

The following describes a modification example in which, in the case where a degree of approximation between color information of measurement voxel data and color information of map voxel data (i.e., a degree of approximation of color information) is calculated, a weight that has an influence on a result of calculation of the degree of approximation is varied between a specified color and a color other than the specified color.

In this modification example, color information in measurement voxel data extracted by extractor 120 is information which indicates a color and is distinguishable between at least a specified color component indicating a specified color and a color component other than the specified color component. In addition, color information in map voxel data managed by map manager 130 is also information distinguishable between a specified color component and a color component other than the specified color component. Position estimator 140 calculates a degree of approximation between color information of measurement voxel data on a measurement voxel and color information of map voxel data on a map voxel, which is used as a basis for the calculating of the above-described likelihood (i.e., a likelihood of a particle and a likelihood of a transformation operation), in such a manner that a degree of influence on the degree of approximation of a specified color component is varied from a degree of influence on the degree of approximation of a color component other than the specified color component, in both of the color information of measurement voxel data and the color information of map voxel data.

As a specific example, a degree of approximation is calculated by an operation in which a specified color component corresponding to a color of a tree or a color of a leaf (for example, a green (G) component of RGB value, a component in a predetermined numeral range, etc) is weighted so as to have less influence on a result of calculating the degree of approximation of color information than a color component other than the specified color component. It should be noted that position estimator 140 may set a weight of the specified color component to zero; that is, exclude the specified color component, and calculate the degree of approximation of color information for only a color component other than the specified color component. In this manner, by setting a color of a tree or a color of a leaf as a specified color, and causing the specified color to have less influence on a result of calculating the degree of approximation of color information than a color component other than the specified color component, it is possible to produce an advantageous effect of suppressing a decrease in accuracy of position estimation which is caused by appropriate collation between a map voxel and a measurement voxel being interfered due to a change over time of an aspect (external appearance or the like) of the tree or the leaf due to years, season, etc. In addition, other than a color of a tree or a color of a leaf, a color of a human skin or the like may be set as a specified color. This may produce an advantageous effect of suppressing a decrease in accuracy of position estimation in a situation in which a large number of people who are not included in a map voxel are present.

In addition, position estimator 140 may calculate a degree of approximation between color information of measurement voxel data on a measurement voxel and color information of map voxel data on a map voxel, in such a manner that, when position information of the measurement voxel satisfies a predetermined position condition, a degree of influence on the degree of approximation of a specified color component is varied from a degree of influence on the degree of approximation of a color component other than the specified color component, in the color information of the measurement voxel. The predetermined position condition is a condition related to, for example, a component at a position in a vertical direction (for example, z coordinate). For example, when the predetermined position condition is a condition that is satisfied when a position is higher than several meters, and a specified color component is set as a component corresponding to a color of a blue sky or a cloudy sky, it is possible to suppress a decrease in accuracy of position estimation caused by a change over time of an aspect of a portion at a high position in a space due to movement of a cloud, or the like.

In the same manner as above, the predetermined position condition may be equal to or less than 2 meters from the ground surface, and a color of a human skin may be set as the specified color. This may produce an advantageous effect of suppressing a decrease in accuracy of position estimation in a situation in which a large number of people who are not included in a map voxel are present.

In addition, position estimator 140 may calculate a degree of approximation between color information of measurement voxel data on a measurement voxel and color information of map voxel data on a map voxel, in such a manner that, when the degree of flatness of the map voxel satisfies a predetermined condition, a degree of influence on the degree of approximation of a specified color component is varied from a degree of influence on the degree of approximation of a color component other than the specified color component, in the color information of the map voxel. For example, although an aspect of a tree or a leaf changes over time due to years, season, etc., a degree of flatness in data of voxels is similar to a spherical or stereoscopic state instead of plane that can be referred to in position estimation. Accordingly, the tree or the leaf may be distinguished according to the degree of flatness in the voxel, in addition to the specified color component. As a predetermined condition, it is possible to specify, for example, a condition that the degree of flatness corresponds to a spherical or stereoscopic state.

Embodiment 2

In Embodiment 2, position estimation apparatus 100a which performs a position estimation method using a reflection intensity (reflection intensity of electromagnetic waves) is used in addition to a position, for estimating a position of a mobile object in a space is mainly described.

Position estimation apparatus 100 according to Embodiment 1 detects a color which is one of attributes of a measurement point and detected by receiving electromagnetic waves, and performs position estimation using a position and the color. In contrast, position estimation apparatus 100a detects a reflection intensity which is another one of the attributes, and performs position estimation using a position and the reflection intensity. It should be noted that components in the present embodiment which are same as components in Embodiment 1 will be applied with names same as those in Embodiment 1.

(2-1. Configuration)

Position estimation apparatus 100a is, as with position estimation apparatus 100 illustrated in FIG. 1, mobile object 102 to which measurement device 101 is attached. Position estimation apparatus 100a is substantially identical to position estimation apparatus 100 according to Embodiment 1, in points not particularly described here. Measurement device 101 is a device such as a 3D scanner using lasers, for example, and measures positions of a plurality of points (measurement points) in a local space in proximity to measurement device 101, and a reflection intensity (reflection intensity of laser light) of electromagnetic waves emitted for position estimation. Unlike Embodiment 1, measurement device 101 according to the present embodiment need not have a function of measuring a color. The reflection intensity of a measurement point is measured, for example, as a light receiving intensity of reflected light (a type of electromagnetic waves) when laser light having a wavelength in a range from 1000 nm to 1550 nm is emitted to a measurement point. Variation of the light receiving intensity due to a material of a target such as a ground or a building is used.

Figure 18:
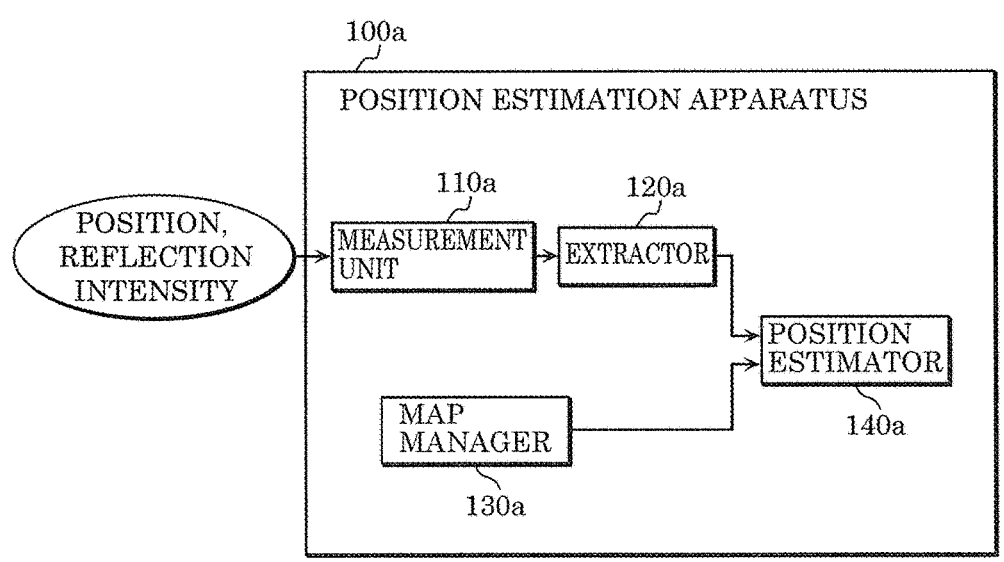
FIG. 18 is a functional block diagram of the position estimation apparatus according to Embodiment 2.

FIG. 18 is a functional block diagram of position estimation apparatus 100a. As illustrated in FIG. 18, position estimation apparatus 100a includes measurement unit 110a, extractor 120a, map manager 130a, and position estimator 140a. The following describes each of the functional components.

Measurement unit 110a has a function of measuring a position and a reflection intensity of each of a plurality of points (i.e., measurement points) in a local space in proximity to mobile object 102, and performs measurement to obtain measurement point data that is a result of the measurement. Measurement unit 110a is implemented by, for example, measurement device 101, and the communication I/F, a processor which executes a control program, etc., in the computer of position estimation apparatus 100a. Measurement unit 110a measures a reflection intensity, and thus a measurement target of measurement unit 100a is different from a measurement target of the above-described measurement unit 100. However, other than the difference in the measurement targets, measurement unit 110a is substantially the same as measurement unit 110, in the points not particularly described here. As exemplified in FIG. 19, measurement point data obtained by measurement unit 110a indicates a position in three-dimensional coordinates x, y, and z, and indicates a reflection intensity which is normalized by a value in a range from 0 to 1. It should be noted that the measurement point data on one measurement point is indicated in one row in FIG. 19.

Extractor 120a has a function of extracting, on the basis of the result of the measurement (measurement point data) performed by measurement unit 110a, position information and attribute information (specifically, reflection intensity information indicating a reflection intensity) of each voxel included in a group of voxels in which the voxels are three-dimensionally arrayed in association with the local space in proximity to mobile object 102. Extractor 120a is implemented by a processor or the like, in the computer of position estimation apparatus 100a, which executes a control program. Extractor 120a extracts position information and reflection intensity information as measurement voxel data on a measurement voxel, and thus is different, in information handled, from the above-described extractor 120 which extracts position information and color information. However, other than the difference, extractor 120a is substantially the same as extractor 120, in the points not particularly described here.

Extractor 120a extracts, for each of the measurement voxels, reflection intensity information included in measurement voxel data (position information and reflection intensity information), for example, by determining reflection intensity information of the measurement voxel in such a manner that the reflection intensity information indicates an average of reflection intensities of points in the measurement voxel which are measured by measurement unit 110a. As an example, extractor 120a averages reflection intensities (values in a range from 0 to 1) of the measurement point data on the measurement points included in the measurement voxel, to calculate reflection intensity information of the measurement voxel data on the measurement voxel. FIG. 20 is a diagram which illustrates an example of measurement voxel data, and the measurement voxel data on one measurement voxel is indicated in one row. As illustrated in FIG. 20, measurement voxel data includes an index which indicates a location of a corresponding measurement voxel in the three-dimensional array of a group of measurement voxels associated with the local space, position information which indicates an average of positions of the respective measurement point data in the measurement voxel, and reflection intensity information which indicates an average reflection intensity that is an average of reflection intensities of the respective measurement point data in the measurement voxel.

Map manager 130a has a function of managing map voxel data; that is position information and attribute information (specifically, reflection intensity information indicating reflection intensity), on each map voxel in a group of map voxels arrayed three-dimensionally in association with a space represented by a map (i.e., a map in which a three-dimensional coordinate system representing a space is determined). Map manager 130a is implemented, for example, by a storage medium such as memory, a communication I/F, a processor which executes a control program, etc., in a computer of position estimation apparatus 100a.

Map manager 130a which manages position information and reflection intensity information as map voxel data is different, in information managed, from the above-described map manager 130 which manages position information and color information. However, other than the difference, map manager 130a and map manager 130 are substantially the same, in points not particularly described here. Map manager 130a manages map information including map voxel data (position information and reflection intensity information) on each map voxel in a group of map voxels resulting from partitioning a space. The map information is generated, for example, by measuring a position and an attribute (specifically, a reflection intensity) of each measurement point in the space, and extracting map voxel data (position information and reflection intensity information) on each map voxel based on a result of the measurement. According to the present embodiment, a data configuration of the map voxel data is assumed to be the same as a data configuration of the measurement voxel data illustrated in FIG. 20. In other words, the map voxel data includes: an index which indicates a location of a map voxel; position information which indicates an average of the results of measuring positions of points (i.e., locations) in a part of a space corresponding to the map voxel; and reflection intensity information which indicates an average of the results of measuring reflection intensity (values in a range from 0 to 1) as attributes which are detected by receiving electromagnetic waves from the points, on the points (i.e., locations) in the part of the space corresponding to the map voxel.

Position estimator 140a has a function of estimating a position of mobile object 102 based on the map voxel data (position information and reflection intensity information as attribute information) of map information managed by map manager 130a, according to the measurement voxel data (position information and reflection intensity information as attribute information) extracted by extractor 120a. Position estimator 140a is implemented by a memory, a processor or the like which executes a control program, in the computer of position estimation apparatus 100a. Position estimator 140a which performs position estimation using position information and reflection intensity information according to a map voxel and a measurement voxel is different, in information handled, from the above-described position estimator 140 which performs position estimation using position information and color information according to a map voxel and a measurement voxel. However, other than the difference, position estimator 140a and position estimator 140 are substantially the same, in points not particularly described here.

Position estimator 140a presumptively determines a transformation operation for transforming position information of the measurement voxel data successively into a three-dimensional coordinate system according to a map, such that position information of the measurement voxel data on a measurement voxel is approximated to position information of the map voxel data on a map voxel. A position of mobile object 102 is estimated by determining the transformation operation. As a method of estimating a position of mobile object 102; that is, a method of presumptively determining a transformation operation, for example, a method of repeating processes of predicting, observing, and resampling, using a particle filter (see FIG. 7) can be used. Position estimator 140a calculates a degree of approximation between position information of each of the map voxels managed by map manager 130a and position information of each of the measurement voxels which is extracted by extractor 120a and is transformed using each of a plurality of transformation operations as candidates. Then, position estimator 140a calculates, for each of the transformation operations, a likelihood based on the degree of approximation of position information and the degree of approximation of attribute information (i.e., reflection intensity information) between a pair of the map voxel and the measurement voxel which has the highest degree of approximation calculated. Position estimator 140a estimates a position of mobile object 102 according to a transformation operation corresponding to the highest likelihood calculated among the plurality of transformation operations as candidates. Here, the degree of approximation of position information which indicates a position or the degree of approximation of reflection intensity information which indicates a reflection intensity indicates the degree that positions or reflection intensities approximate to each other, and indicates a highest value when the positions or the reflection intensities are equivalent. Position estimator 140a repeatedly performs calculating of a likelihood and estimation of a position of the mobile object, based on calculation of the degree of approximation according to each of the measurement voxels transformed using each of the plurality of transformation operations, and determines a plurality of transformation operations to be used in the next transformation, based on a result of calculating of the likelihood.

(2-2. Operation)

The following describes an operation (i.e., a position estimation method) of position estimation apparatus 100a including the above-described configuration.

measurement unit 110a measures a position and a reflection intensity of each of a plurality of points in a local space in proximity to mobile object 102, to obtain measurement point data.

Extractor 120a performs the processes in Step S11 to Step S17 illustrated in FIG. 6, in the same manner as the above-described extractor 120. In Step S16, however, extractor 120a updates reflection intensity information of the measurement voxel identified in Step S14, using a reflection intensity in the measurement point data obtained in Step S13, instead of updating color information. In this manner, the measurement voxel data (position information and reflection intensity information) as illustrated in FIG. 20 which is temporarily held by a storage medium such as a memory is updated.

Position estimator 140a presumptively determines a transformation operation for transforming position information of the measurement voxel data successively into a three-dimensional coordinate system according to a map, in such a manner that position information of the measurement voxel data on a measurement voxel is approximated to position information of the map voxel data on a map voxel, thereby estimating a position based on the estimated transformation operation. A particle filter is used as one method for this estimation. More specifically, a particle is used as a means of estimating a transformation operation having a high likelihood. A transformation operation is identified for each of the particles.

Position estimator 140a performs the processes in Step S21 to Step S25 and Step S31 to Step S39 illustrated in FIG. 7 and FIG. 8, in the same manner as the above-described position estimator 140. In Step S35, however, position estimator 140a calculates, instead of a degree of approximation of color information, a degree of approximation between reflection intensity information of map voxel data on the map voxel identified in Step S33 and reflection intensity information of measurement voxel data on the target measurement voxel, and adds the calculated degree of approximation to the sum of likelihoods. The degree of approximation of reflection intensity information of the voxels (the identified map voxel and the target measurement voxel) can be calculated based on a math formula or the like determined in advance such that, for example, the degree of approximation increases with decreasing difference R between the reflection intensities (an average of reflection intensities as values in a range from 0 to 1; that is, an average reflection intensity) indicated by the reflection intensity information of the identified map voxel and the reflection intensity information of the target measurement voxel.

Figure 21:
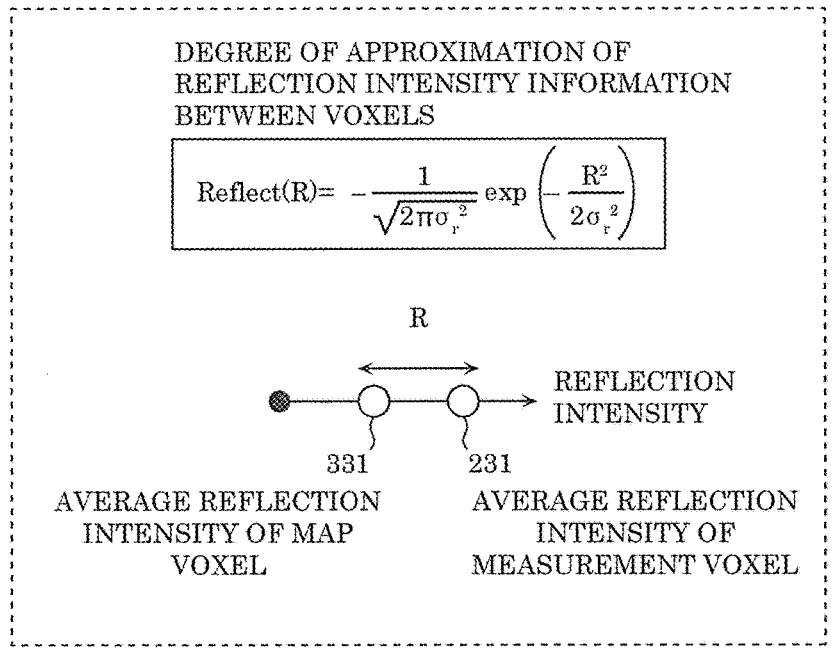
FIG. 21 is a diagram which illustrates an example of calculating a degree of approximation of reflection intensity information of voxels.

FIG. 21 indicates an example of calculating a degree of approximation in which Reflect (R) is calculated as the degree of approximation, based on difference R between average reflection intensity 331 indicated by the reflection intensity information of a map voxel and average reflection intensity 231 indicated by the reflection intensity information of a measurement voxel. Position estimator 140a may calculate, for example, as Reflect (R), the degree of approximation of reflection intensity information indicating reflection intensities having difference R therebetween, as in the expression indicated in FIG. 21. It should be noted that, the degree of approximation of position information is added to the sum of likelihoods in Step S34, and the degree of approximation of reflection intensity information is added to the sum of likelihoods in Step S35. However, these are mere examples of processes for finally calculating a likelihood per a particle based on correlation, between the map voxel and the measurement voxel, related to position information and reflection intensity information. Instead of adding the degree of approximation of position information and the degree of approximation of reflection intensity information to the sum of likelihoods in Step S34 and Step S35, for example, a result of multiplying the degree of approximation of position information by the degree of approximation of reflection intensity information may be added to the sum of likelihoods, or for example, in order to differentiate a weight of influence on a likelihood between the position information and the reflection intensity information, a degree of approximation of position information which is multiplied by a coefficient and a degree of approximation related to reflection intensity information may be added to the sum of likelihoods.

Position estimator 140*a* outputs, as a result of the position estimation, components (three-dimensional coordinates and a rotation angle) of a particle indicated by the particle data of a particle having the highest likelihood in Step S39.

It should be noted that in Step S39, position estimator 140*a* may output, as a result of the position estimation, a result of performing weighted averaging according to the likelihood of a particle for the components (three-dimensional coordinates and a rotation angle) of each of the particles, instead of outputting the components of a particle having the highest likelihood. A weighted average is obtained by dividing the likelihood of each of the particles by the sum of likelihoods of the particles as a whole, for normalization.

(2-3. Advantageous Effect, etc.)

With the above-described position estimation apparatus 100*a*, not only a position but also a reflection intensity is measured, and position estimation is performed using reflection intensity information in addition to a position of a voxel, and thus it is highly possible that a position of a mobile object can be promptly and properly estimated even in an environment where structures having similar shapes are consecutively disposed, because reflection intensities differ depending on materials of the structures.

(2-4. Modification Examples)

The following describes a modification example in which, when a degree of approximation between reflection intensity information that is attribute information in measurement voxel data and reflection intensity information that is attribute information in map voxel data (i.e., a degree of approximation of reflection intensity information) is calculated, a weight that has an influence on a result of calculation of the degree of approximation is varied between a reflection intensity higher than a predetermined intensity and a reflection intensity equal to or lower than the predetermined intensity.

According to this modification example, position estimator 140*a* calculates a degree of approximation between reflection intensity information of measurement voxel data on a measurement voxel and reflection intensity information of map voxel data on a map voxel, which is used as a basis for the calculating of the above-described likelihood (i.e., a likelihood of a particle and a likelihood of a transformation operation), in such a manner that a degree of influence on the degree of approximation when the reflection intensity information indicates a reflection intensity higher than a predetermined intensity is varied from a degree of influence on the degree of approximation when the reflection intensity information indicates a reflection intensity equal to or lower than the predetermined intensity. As a specific example, a degree of approximation is calculated by an operation in which a reflection intensity slightly lower than a reflection intensity of a road display using, for example, a white or yellow reflection sheet (while line on a road surface, etc.) is determined as a predetermined intensity, and a reflection intensity high than the predetermined intensity is weighted so as to have greater influence on the degree of approximation than a reflection intensity equal to or lower than the predetermined intensity. It should be noted that position estimator 140*a* may calculate a degree of approximation of reflection intensity information other than reflection intensity information indicating a reflection intensity higher than the predetermined intensity, to be zero or approximately zero. In this manner, there is a possibility that position estimation based on a road display is carried out with accuracy.

In addition, position estimator 140*a* may calculate a degree of approximation between reflection intensity information of measurement voxel data on a measurement voxel and reflection intensity information of map voxel data on a map voxel, in such a manner that, when position information of the measurement voxel satisfies a predetermined position condition, a degree of influence on the degree of approximation when the reflection intensity corresponding to the measurement voxel indicates a reflection intensity higher than the predetermined intensity is higher than a degree of influence on the degree of approximation when the reflection intensity information indicates a reflection intensity equal to or lower than the predetermined intensity. The predetermined position condition is a condition related to, for example, a component at a position in a vertical direction (for example, z coordinate). For example, the predetermined position condition may be a condition that is satisfied when a position is close to a road surface, to allow position estimation based on a road display to be carried out more properly.

Embodiment 3

In Embodiment 3, position estimation apparatus 100*b* which performs a position estimation method using a temperature in addition to a position, for estimating a position of a moving object in a space is mainly described.

Position estimation apparatus 100 according to Embodiment 1 detects a color which is one of attributes of a measurement point and detected by receiving electromagnetic waves, and performs position estimation using a position and the color. In contrast, position estimation apparatus 100*b* detects a temperature which is another one of the attributes, and performs position estimation using a position and the temperature. It should be noted that components in the present embodiment which are same as components in Embodiment 1 will be applied with names same as those in Embodiment 1.

(3-1. Configuration)

Position estimation apparatus 100*b* is, as with position estimation apparatus 100 illustrated in FIG. 1, mobile object 102 to which measurement device 101 is attached. Position estimation apparatus 100*b* is substantially identical to position estimation apparatus 100 according to Embodiment 1, in points not particularly described here. Measurement device 101 is, for example, a combination of a 3D scanner and a thermography device and measures a position and a temperature of each of a plurality of points (measurement points) in a local space in the vicinity of measurement device 101. In the case where measurement device 101 is a combination of a 3D scanner and a thermography device, for example, the 3D scanner and the thermography device are aligned in advance. Unlike Embodiment 1, measurement device 101 according to the present embodiment need not have a function of measuring a color. The temperature of a measurement point is measured by detecting infrared light (a type of electromagnetic waves) having a wavelength in a range from 2 μm to 14 μm, for example. Variation of the temperature due to a material of a target such as a ground or a building is used.

Figure 22:
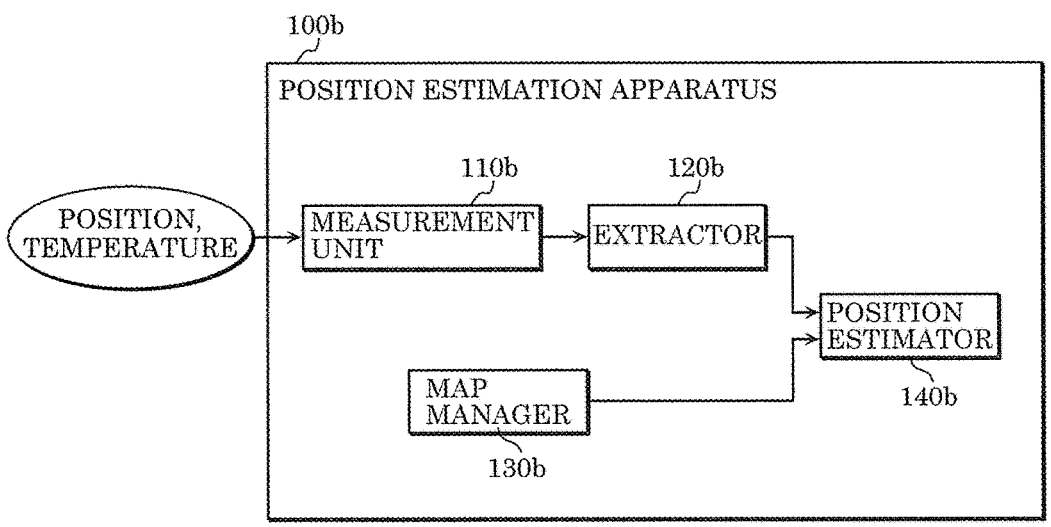
FIG. 22 is a functional block diagram of the position estimation apparatus according to Embodiment 3.

FIG. 22 is a functional block diagram of position estimation apparatus 100b. As illustrated in FIG. 22, position estimation apparatus 100b includes measurement unit 100b, extractor 120b, map manager 130b, and position estimator 140b. The following describes each of the functional components.

Measurement unit 110b has a function of measuring a position and a temperature of each of a plurality of points (i.e., measurement points) in a local space in the vicinity of mobile object 102, and obtains performs measurement point data that is a result of the measurement. Measurement unit 110b is implemented by, for example, measurement device 101, and the communication I/F, a processor which executes a control program, etc., in the computer of position estimation apparatus 100b. Measurement unit 110b measures a temperature, and thus is different, in measurement targets, from the above-described measurement unit 110 which measures a color. However, other than the difference in the measurement targets, measurement unit 110b is substantially the same as measurement unit 110, in the points not particularly described here. As exemplified in FIG. 23, measurement point data obtained by measurement unit 110b indicates a position in three-dimensional coordinates x, y, and z, and indicates a temperature as a numerical value (for example, a value of an absolute temperature). It should be noted that the measurement point data on one measurement point is indicated in one row in FIG. 23.

Extractor 120b has a function of extracting, on the basis of the result of the measurement (measurement point data) performed by measurement unit 110b, position information and attribute information (specifically, temperature information indicating a temperature) of each voxel included in a group of voxels in which the voxels are three-dimensionally arrayed in association with the local space in the vicinity of mobile object 102. Extractor 120b is implemented by a processor or the like which executes a control program, in the computer of position estimation apparatus 100b. Extractor 120b extracts position information and temperature information as measurement voxel data on a measurement voxel, and thus is different, in information handled, from the above-described extractor 120 which extracts position information and color information. However, other than the difference, extractor 120b is substantially the same as extractor 120, in the points not particularly described here.

Extractor 120b extracts, for each of the measurement voxels, temperature information included in measurement voxel data (position information and temperature information), for example, by determining temperature information of the measurement voxel in such a manner that the temperature information indicates an average of temperatures of points in the measurement voxel which are measured by measurement unit 110b. As an example, extractor 120b averages temperatures of the measurement point data on the measurement points included in the measurement voxel, to calculate temperature information of the measurement voxel data on the measurement voxel.

FIG. 24 is a diagram which illustrates an example of measurement voxel data, and the measurement voxel data on one measurement voxel is indicated in one row. As illustrated in FIG. 24, measurement voxel data includes an index which indicates a location of a corresponding measurement voxel in the three-dimensional array of a group of measurement voxels associated with the local space, position information which indicates an average of positions of the respective measurement point data in the measurement voxel, and temperature information which indicates an average temperature that is an average of temperatures of the respective measurement point data in the measurement voxel.

Map manager 130b has a function of managing map voxel data; that is position information and attribute information (specifically, temperature information indicating a temperature), on each map voxel in a group of map voxels arrayed three-dimensionally in association with a space represented by a map (i.e., a map in which a three-dimensional coordinate system representing a space is determined). Map manager 130b is implemented, for example, by a storage medium such as a memory, a communication I/F, a processor which executes a control program, etc., in a computer of position estimation apparatus 100b. Map manager 130b manages position information and temperature information as map voxel data, and thus is different, in information managed, from the above-described map manager 130 which manages position information and color information. However, other than the difference, map manager 130b and map manager 130 are the same in points not particularly described here.

Map manager 130b manages map information including map voxel data (position information and temperature information) on each map voxel in a group of map voxels resulting from partitioning a space. The map information is generated, for example, by measuring a position and an attribute (specifically, a temperature) of each measurement point in the space, and extracting map voxel data (position information and temperature information) on each map voxel based on a result of the measurement. According to the present embodiment, a data configuration of the map voxel data is assumed to be the same as a data configuration of the measurement voxel data illustrated in FIG. 24. In other words, the map voxel data includes: an index which indicates a location of a map voxel; position information which indicates an average of the results of measuring positions of points (i.e., locations) in a part of a space corresponding to the map voxel; and temperature information which indicates an average of the results of measuring temperatures as attributes which are detected by receiving electromagnetic waves from the points, on the points (i.e., locations) in the part of the space corresponding to the map voxel.

Position estimator 140b has a function of estimating a position of mobile object 102 based on the map voxel data (position information and temperature information as attribute information) of map information managed by map manager 130b, according to the measurement voxel data (position information and temperature information as attribute information) extracted by extractor 120b. Position estimator 140b is implemented by, for example, a memory, a processor or the like which executes a control program, in the computer of position estimation apparatus 100b. Position estimator 140b performs position estimation using position information and temperature information according to a map voxel and a measurement voxel, and thus is different, in information handled, from the above-described position estimator 140 which performs position estimation using position information and color information according to a map voxel and a measurement voxel. However, other than the difference, position estimator 140b and position estimator 140 are substantially the same in points not particularly described here. Position estimator 140b presumptively determines a transformation operation for transforming position information of the measurement voxel data successively into a three-dimensional coordinate system according to a map, in such a manner that position information of the measurement voxel data on a measurement voxel is approximated to position information of the map voxel data on a map voxel. A position of mobile object 102 is estimated by determining the transformation operation. As a method of estimating a position of mobile object 102; that is, a method of presumptively determining a transformation operation, for example, a method of repeating processes of predicting, observing, and resampling, using a particle filter (see FIG. 7) can be used.

Position estimator 140b calculates a degree of approximation between position information of each of the map voxels managed by map manager 130b and position information of each of the measurement voxels which is transformed using each of a plurality of transformation operations as candidates, and extracted by extractor 120b. Then, position estimator 140b calculates, for each of the transformation operations, a likelihood based on the degree of approximation of position information and the degree of approximation of attribute information (i.e., temperature information) between a pair of the map voxel and the measurement voxel which has the highest degree of approximation calculated. Position estimator 140b estimates a position of mobile object 102 according to a transformation operation corresponding to the highest likelihood calculated among the plurality of transformation operations as candidates. Here, the degree of approximation of position information which indicates a position or the degree of approximation of temperature information which indicates a temperature indicates the degree that positions or temperatures approximate to each other, and indicates a highest value when the positions or the temperatures are equivalent. Position estimator 140b repeatedly performs calculating of a likelihood and estimation of a position of the mobile object, based on calculation of the degree of approximation according to each of the measurement voxels transformed using each of the plurality of transformation operations, and determines a plurality of transformation operations to be used in the next transformation, based on a result of calculating of the likelihood.

(3-2. Operation)

The following describes an operation of position estimation apparatus 100b including the above-described configuration (i.e., a position estimation method).

Measurement unit 110b measures a position and a temperature of each of a plurality of points in a local space in proximity to mobile object 102, to obtain measurement point data.

Extractor 120b performs the processes in Step S11 to Step S17 illustrated in FIG. 6, in the same manner as the above-described extractor 120. In Step S16, however, extractor 120b updates temperature information of the measurement voxel identified in Step S14, using a temperature in the measurement point data obtained in Step S13, instead of updating color information. In this manner, the measurement voxel data (position information and temperature information) as illustrated in FIG. 24 which is temporarily held by a storage medium such as a memory is updated.

Position estimator 140b presumptively determines a transformation operation for transforming position information of the measurement voxel data successively into a three-dimensional coordinate system according to a map, in such a manner that position information of the measurement voxel data on a measurement voxel is approximated to position information of the map voxel data on a map voxel, thereby estimating a position based on the estimated transformation operation. A particle filter is used as one method for this. More specifically, a particle is used as a means of estimating a transformation operation having a high likelihood. A transformation operation is identified for each of the particles. Position estimator 140b performs the processes in Step S21 to Step S25 and Step S31 to Step S39 illustrated in FIG. 7 and FIG. 8, in the same manner as the above-described position estimator 140. In Step S35, however, position estimator 140b calculates a degree of approximation between temperature information of the map voxel data of the map voxel identified in Step S33 and temperature information of the measurement voxel data of the target measurement voxel, and adds the degree of approximation to the sum of likelihoods. The degree of approximation of temperature information of the voxels (the identified map voxel and the target measurement voxel) can be calculated based on a math formula or the like determined in advance such that, for example, the degree of approximation increases with decreasing difference T between the temperatures (an average of temperatures) indicated by the temperature information of the identified map voxel and the temperature information of the target measurement voxel.

Figure 25:
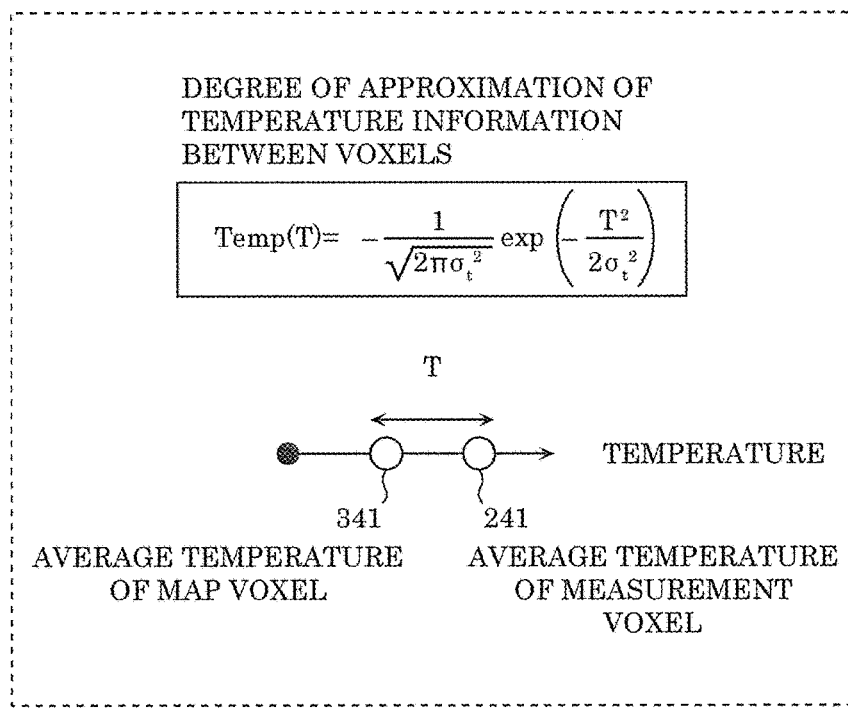
FIG. 25 is a diagram which illustrates an example of calculating a degree of approximation of temperature information of voxels.

FIG. 25 illustrates an example of calculating a degree of approximation in which Temp (T) is calculated as the degree of approximation, based on difference T between average temperature 341 indicated by temperature information of a map voxel and average temperature 241 indicated by temperature information of a measurement voxel. Position estimator 140b may calculate, for example, as Temp (T), the degree of approximation of temperature information indicating temperatures having difference T therebetween, as in the expression indicated in FIG. 25. As described above, the degree of approximation of position information is added to the sum of likelihoods in Step S34, and the degree of approximation of temperature information is added to the sum of likelihoods in Step S35. However, these are mere examples of processes for finally calculating a likelihood per a particle based on correlation, related to position information and temperature information, between the map voxel and the measurement voxel. Instead of adding the degree of approximation of position information and the degree of approximation of temperature information to the sum of likelihoods in Step S34 and Step S35, for example, a result of multiplying the degree of approximation of position information by the degree of approximation of temperature information may be added to the sum of likelihoods, or for example, in order to differentiate a weight of influence on a likelihood between the position information and the temperature information, a degree of approximation of position information which is multiplied by a coefficient and a degree of approximation of temperature information may be added to the sum of likelihoods.

Position estimator 140b outputs, as a result of the position estimation, components (three-dimensional coordinates and a rotation angle) of a particle indicated by the particle data of a particle having the highest likelihood in Step S39.

It should be noted that in Step S39, position estimator 140b may output, as a result of the position estimation, a result of performing weighted averaging according to the likelihood of a particle for the components (three-dimensional coordinates and a rotation angle) of each of the particles, instead of outputting the components of a particle having the highest likelihood. A weighted average is obtained by dividing the likelihood of each of the particles by the sum of likelihoods of the particles as a whole, for normalization.

(3-3. Advantageous Effect, etc.)

With the above-described position estimation apparatus 100b, not only a position but also a temperature is measured, and position estimation is performed using temperature information in addition to a position of a voxel, and thus it is highly possible that a position of a mobile object can be promptly and properly estimated even in an environment where structures having similar shapes are consecutively disposed, because temperatures differ depending on materials of the structures.

(3-4. Modification Examples)

The following describes a modification example in which, in the case where a degree of approximation between temperature information that is attribute information in measurement voxel data and temperature information that is attribute information in map voxel data (i.e., a degree of approximation of temperature information) is calculated, a degree of influence on a result of calculation of the degree of approximation is higher when a temperature out of a predetermined temperature range corresponding to a human body temperature is indicated than when a temperature in a predetermined temperature range is indicated.

According to this modification example, position estimator 140b calculates a degree of approximation between temperature information of measurement voxel data on a measurement voxel and temperature information of map voxel data on a map voxel, which is used as a basis for the calculating of the above-described likelihood (i.e., a likelihood of a particle and a likelihood of a transformation operation), in such a manner that a degree of influence on the degree of approximation when the temperature information indicates a temperature in a temperature range corresponding to a human body temperature (for example, an absolute temperature of 308 K to 313 K) is varied from a degree of influence on the degree of approximation when the temperature information indicates a temperature out of the temperature range. As a specific example, a degree of approximation is calculated by an operation in which a temperature in the temperature range corresponding to a human body temperature is weighted so as to have less influence on the degree of approximation than a temperature out of the temperature range. It should be noted that position estimator 140b may calculate a degree of approximation of temperature information other than temperature information indicating a temperature out of the temperature range corresponding to a human body temperature, to be zero or approximately zero. As described above, by distinguishing the temperature range corresponding to a human body temperature and excluding a human moving over time from a result of measurement, it is possible to produce an advantageous effect of suppressing a decrease in accuracy of position estimation which is caused by appropriate collation between a map voxel and a measurement voxel being interfered.

In addition, position estimator 140b may calculate a degree of approximation between temperature information of measurement voxel data on a measurement voxel and temperature information of map voxel data on a map voxel, in such a manner that, when position information of the measurement voxel satisfies a predetermined position condition, a degree of influence on the degree of approximation when the temperature information indicates a temperature in the temperature range corresponding to a human body temperature is lower than a degree of influence on the degree of approximation when the temperature information indicates a temperature out of the temperature range. The predetermined position condition is a condition related to, for example, a component at a position in a vertical direction (for example, z coordinate). For example, the predetermined position condition may be a condition that is satisfied when a position is lower than or equal to 2 meters where a human is possibly present in general. In this manner, it is possible to effectively use a result of measurement of a temperature in a temperature range corresponding to a human body temperature, in a place, for example, higher than 2 meters.

Other Embodiments

Embodiments 1 to 3 have been described above, as examples of the technique disclosed by the present application. However, the technique according to the present disclosure is not limited to these examples, and is also be applicable to embodiments to which modification, replacement, addition, omission, etc., are provided as necessary.

Each of Modifications 1 to 4 according to position estimation apparatus 100 of the above-described Embodiment 1 is also applicable to position estimation apparatus 100a and position estimation apparatus 100b according to Embodiment 2 and Embodiment 3, respectively. In application of Modifications 2 to 4, for example, the color information as attribute information may be replaced with the reflection intensity information or the temperature information, and the color as an attribute may be replaced with a reflection intensity or a temperature.

In addition, although the above-described embodiments describe the example in which measurement device 101 is attached to mobile object 102, measurement device 101 only need to be present in proximity to mobile object 102 and need not be attached to mobile object 102.

In addition, although position estimation apparatuses 100, 100a, and 100b each include mobile object 102 to which measurement device 101 is attached in the above-described embodiments, this is mere an example. Position estimation apparatuses 100, 100a, and 100b each may include a part of mobile object 102 (or a device mounted in mobile object 102) and measurement device 101, or may include measurement device 101 attached to mobile object 102 and a computer which is space apart from mobile object 102 and is capable of receiving a result of measurement from measurement device 101.

In addition, the color described in the above-described embodiments need not be a color detected in the entire wavelength range of visible light, and may be a color detected in light that is limited to a portion of the wavelength range of visible light using a filter. In addition, the color may be monochrome.

In addition, the map voxel described in the above-described embodiments may be generated several times in different points of time so as to include a ratio of temporal changes in various information items of the map voxel into the map voxel data. For example, it is possible to distinguish between a ground surface and a building or the like, or distinguish a target which changes over time, such as a tree and a leaf, by causing each of the map voxels to have a temporal change in the attribute information such as a temperature, a reflection intensity of an electromagnetic wave, etc., in addition to the position information. As an example, the position information of a target which changes over time, such as a tree and a leaf, changes over time. In addition, as an example, it is possible to use a phenomenon in which a temperature change in asphalt, concrete, and grass is large in this order with respect to a change in an ambient temperature. In addition, as an example, in the case where a plant such as grass inhabits on a wall surface or a road surface, there is less changes in the position information, but a reflection intensity of laser or the like changes according to an area of the plant.

In addition, although an example in which a particle filter is used for estimating an appropriate transformation operation which associates a measurement voxel and a map voxel based on a likelihood, this example is merely one of the techniques. For example, an interactive closest point (ICP) algorithm for obtaining a pair of corresponding points between two groups of points, and obtaining a position based on a least sum of squares of a distance between the corresponding points may be used.

In addition, the map information described in the above-described embodiments may include only map voxel data or may include measurement point data or the like resulting from measurement.

In addition, each of the functional structural elements (functional blocks) included in position estimation apparatuses 100, 100a, and 100b may be realized as a single chip one-by-one, or as a single chip to include part or all of the functional structural elements, by a semiconductor device such as an integrated circuit (IC) and a large scale integration (LSI). Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose. Furthermore, when a technology for the integrated circuit replacing LSI is developed with the advance of semiconductor technology or relevant technology, functional blocks can be integrated using the technology. The possibility is that the present invention is applied to biotechnology.

In addition, a part or all of each of the above-described processes (for example, the processes illustrated in FIG. 6 to FIG. 8) may be implemented by hardware such as an electronic circuit, or may be implemented by software. It should be noted that the processes performed by software are implemented by a processor included in the position estimation apparatus executing a control program stored on a memory. In addition, the control program may be recorded on a recording medium to be distributed. For example, it is possible to cause a position estimation apparatus to perform the various processes (the processes illustrated in FIG. 6 to FIG. 8), by installing the distributed control program on the position estimation apparatus and causing a processor of the position estimation apparatus to execute the control program. The position estimation apparatus need not include, for example, a measurement device, and may be a computer which performs position estimation by obtaining a result of measurement performed by a measurement device.

Furthermore, an embodiment which is implemented by arbitrarily combining the structural elements and functions described in the above-described embodiments is also included in the scope of the present disclosure.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable to an apparatus which estimates position information of a mobile object.

What is claimed is:

1. A position estimation apparatus which estimates a position of a mobile object in a space, the position estimation apparatus comprising:
a measurement unit configured to measure, for each of a plurality of points in a local space in proximity to the mobile object, a position and an attribute that is detected by receiving electromagnetic waves from the point;
an extractor which extracts position information and attribute information from a result of the measuring by the measurement unit, for each measurement voxel in a group of measurement voxels arrayed three-dimensionally in association with the local space;
a map manager which manages position information and attribute information, for each map voxel in a group of map voxels arrayed three-dimensionally in association with the space represented by a map; and
a position estimator which estimates a position of the mobile object, based on (i) a position information approximation degree that is a degree of approximation between the position information of each map voxel managed by the map manager and the position information of each measurement voxel extracted by the extractor and (ii) an attribute information approximation degree that is a degree of approximation between the attribute information of each map voxel managed by the map manager and the attribute information of each measurement voxel extracted by the extractor, wherein
the position estimator:
calculates a degree of approximation between the position information of each map voxel and the position information of each measurement voxel which is transformed using each of a plurality of transformation operations for transforming a three-dimensional coordinate system of the local space into a three-dimensional coordinate system of the space;
calculates, for each of the plurality of transformation operations, a likelihood based on the position information approximation degree having a highest degree of approximation among the calculated degrees of approximation and the attribute information approximation degree having a highest degree of approximation among the calculated degrees of approximation; and
performs the estimating of the position of the mobile object according to, among the plurality of transformation operations, a transformation operation corresponding to a highest likelihood among the calculated likelihoods, or a transformation operation resulting from performing weighted averaging according to the calculated likelihoods.

2. The position estimation apparatus according to claim 1, wherein
the position estimator repeats the calculating of the likelihood and the estimating of the position of the mobile object, based on the calculating of the degree of approximation between the position information of each map voxel and the position information of each measurement voxel which is transformed using each of the plurality of transformation operations, and determines the plurality of transformation operations used in the transforming to be performed next, based on a result of the calculating of the likelihood.

3. The position estimation apparatus according to claim 1, wherein the position estimator:
calculates a degree of approximation between the position information of each map voxel and the position information of each measurement voxel, the position information of each measurement voxel being transformed using each of a plurality of transformation operations for transforming a three-dimensional coordinate system of the local space into a three-dimensional coordinate system of the space;
calculates, for each of the plurality of transformation operations, a likelihood based on the position information approximation degree having a highest degree of approximation among the calculated degrees of approximation;
performs the estimating of the mobile object according to, among the plurality of transformation operations, a transformation operation corresponding to a highest likelihood among the calculated likelihoods, or a transformation operation resulting from performing weighted averaging according to the calculated likelihoods; and
repeats the calculating of the likelihood and the estimating of the position of the mobile object, based on the calculating of the degree of approximation between the position information of each map voxel and the position information of each measurement voxel which is transformed using each of the plurality of transformation operations, determines the plurality of transformation operations used in the transforming to be performed next, based on a result of the calculating of the likelihood, and performs the calculating of the likelihood based on the attribute information approximation degree in addition to the position information approximation degree, under a predetermined condition other than a first time of performing the repeating.

4. The position estimation apparatus according to claim 1, wherein the extractor performs the extracting by determining, for each of the measurement voxels, position information of the measurement voxel such that the position information indicates an average of positions of the plurality of points in the measurement voxel, the positions being measured by the measurement unit, and
the position information of each map voxel managed by the map manager indicates an average of positions of a plurality of points in a portion of the space corresponding to the map voxel.

5. The position estimation apparatus according to claim 4, wherein the position information of each of the measurement voxels extracted by the extractor or the position information of each of the map voxels managed by the map manager further indicates a plane identified by a variance-covariance matrix determined based on a position of each point in the measurement voxel or the map voxel, and
the position estimator performs the calculating of the likelihood by identifying the position information approximation degree, according to a distance between (i) an average of positions indicated by one of the position information of each map voxel and the position information of each measurement voxel and (ii) a plane indicated by another of the position information of each map voxel and the position information of each measurement voxel.

6. The position estimation apparatus according to claim 1, wherein the extractor performs the extracting by determining, for each of the measurement voxels, attribute information of the measurement voxel such that the attribute information indicates a histogram based on an attribute of each point in the measurement voxel, the attribute being measured by the measurement unit,
the attribute information of each map voxel managed by the map manager indicates a histogram of a plurality of points in a portion of the space corresponding to the map voxel, the histogram being based on attributes detected by receiving electromagnetic waves from the plurality of points, and
the position estimator performs the calculating of the likelihood by identifying the attribute information approximation degree, according to a distance between the histogram indicated by one of the attribute information of each map voxel and the attribute information of each measurement voxel and the histogram indicated by another of the attribute information of each map voxel and the attribute information of each measurement voxel.

7. The position estimation apparatus according to claim 1, wherein the extractor performs the extracting by determining, for each of the measurement voxels, attribute information of the measurement voxel such that the attribute information indicates an average of attributes of the plurality of points in the measurement voxel, the attributes being measured by the measurement unit, and
the attribute information of each map voxel managed by the map manager indicates an average of attributes of a plurality of points in a portion of the space corresponding to the map voxel, the attributes being detected by receiving electromagnetic waves from the plurality of points.

8. The position estimation apparatus according to claim 1, wherein the extractor performs the extracting by determining, for each of the measurement voxels, attribute information of the measurement voxel such that the attribute information indicates a correlation between a position and an attribute of each point in the measurement voxel which are measured by the measurement unit, and
the attribute information of each map voxel managed by the map manager indicates a correlation of each of a plurality of points in a portion of the space corresponding to the map voxel, the correlation being a correlation between a position and an attribute that is detected by receiving electromagnetic waves.

9. The position estimation apparatus according to claim 1, wherein the extractor performs the extracting by determining, for each of the measurement voxels, attribute information of the measurement voxel such that the attribute information indicates a correlation of each point in the measurement voxel and one or more measurement voxels adjacent to the measurement voxel, the correlation being a correlation between a position and an attribute which are measured by the measurement unit, and
the attribute information of each map voxel managed by the map manager indicates a correlation of each of a plurality of points in a portion of the space corresponding to the map voxel and a portion of the space corresponding to one or more map voxels adjacent to the map voxel, the correlation being a correlation between a position and an attribute that is detected by receiving electromagnetic waves.

10. The position estimation apparatus according to claim 1, wherein
the attribute measured by the measurement unit is a color,
the attribute information extracted by the extractor is color information indicating a color, and
the attribute information managed by the map manager is color information indicating a color.

11. The position estimation apparatus according to claim 10, wherein
each of the color information extracted by the extractor and the color information managed by the map manager is information distinguishable between a specified color component and a color component other than the specified color component, and
the position estimator calculates the attribute information approximation degree which is used as a basis for the calculating of the likelihood such that a degree of influence on a degree of approximation of the specified color component is varied from a degree of influence on a degree of approximation of the color component other than the specified color component, in the attribute information of each measurement voxel and the attribute information of each map voxel.

12. The position estimation apparatus according to claim 10, wherein
each of the color information extracted by the extractor and the color information managed by the map manager is information distinguishable between a specified color component and a color component other than the specified color component, and
the position estimator calculates the attribute information approximation degree which is used as a basis for the calculating of the likelihood such that, when the position information of each measurement voxel satisfies a predetermined position condition, a degree of influence on a degree of approximation of the specified color component is varied from a degree of influence on a degree of approximation of the color component other than the specified color component, in the attribute information of the measurement voxel.

13. The position estimation apparatus according to claim 10, wherein
the map manager manages a degree of flatness, for each map voxel in the group of map voxels arrayed three-dimensionally in association with the space represented by the map, and
the position estimator calculates the attribute information approximation degree which is used as a basis for the calculating of the likelihood such that, when the degree of flatness of each map voxel satisfies a predetermined condition, a degree of influence on a degree of approximation of the specified color component is varied from a degree of influence on a degree of approximation of the color component other than the specified color component, in the attribute information of the map voxel.

14. The position estimation apparatus according to claim 1, wherein
the attribute measured by the measurement unit is a reflection intensity of an electromagnetic wave,
the attribute information extracted by the extractor indicates a reflection intensity, and
the attribute information managed by the map manager indicates a reflection intensity.

15. The position estimation apparatus according to claim 14, wherein
the position estimator calculates the attribute information approximation degree which is used as a basis for the calculating of the likelihood such that, when the position information of each measurement voxel satisfies a predetermined position condition, a degree of influence on a degree of approximation when the attribute information of the measurement voxel indicates a reflection intensity higher than a predetermined intensity is higher than a degree of influence on a degree of approximation when the attribute information of the measurement voxel indicates a reflection intensity equal to or lower than the predetermined intensity, in the attribute information of the measurement voxel.

16. The position estimation apparatus according to claim 1, wherein
the attribute measured by the measurement unit is a temperature,
the attribute information extracted by the extractor indicates a temperature, and
the attribute information managed by the map manager indicates a temperature.

17. The position estimation apparatus according to claim 16, wherein
the position estimator calculates the attribute information approximation degree which is used as a basis for the calculating of the likelihood such that, when the position information of each measurement voxel satisfies a predetermined position condition, a degree of influence on a degree of approximation when the attribute information of the measurement voxel indicates a temperature out of a predetermined temperature range that corresponds to a body temperature of a human is higher than a degree of influence on a degree of approximation when the attribute information of the measurement voxel indicates a temperature in the predetermined temperature range, in the attribute information of the measurement voxel.

18. The position estimation apparatus according to claim 1, wherein
the position estimator outputs estimated information indicating a position of the mobile object.

19. A position estimation method performed by a position estimation apparatus which estimates a position of a mobile object in a space, the position estimation method comprising:
measuring, for each of a plurality of points in a local space in proximity to the mobile object, a position and an attribute that is detected by receiving electromagnetic waves from the point;
extracting position information and attribute information from a result of the measuring, for each measurement voxel in a group of measurement voxels arrayed three-dimensionally in association with the local space;
managing position information and attribute information, for each map voxel in a group of map voxels arrayed three-dimensionally in association with the space represented by a map; and
estimating a position of the mobile object, based on (i) a position information approximation degree that is a degree of approximation between the position information of each map voxel managed in the managing and the position information of each measurement voxel extracted in the extracting and (ii) an attribute information approximation degree that is a degree of approximation between the attribute information of each map voxel managed in the managing and the attribute information of each measurement voxel extracted in the extracting, wherein the estimating comprises:

calculating a degree of approximation between the position information of each map voxel and the position information of each measurement voxel which is transformed using each of a plurality of transformation operations for transforming a three-dimensional coordinate system of the local space into a three-dimensional coordinate system of the space;

calculating, for each of the plurality of transformation operations, a likelihood based on the position information approximation degree having a highest degree of approximation among the calculated degrees of approximation and the attribute information approximation degree having a highest degree of approximation among the calculated degrees of approximation; and performing the estimating of the position of the mobile object according to, among the plurality of transformation operations, a transformation operation corresponding to a highest likelihood among the calculated likelihoods, or a transformation operation resulting from performing weighted averaging according to the calculated likelihoods.

* * * * *